US010718651B2

(12) United States Patent
Falcon et al.

(10) Patent No.: US 10,718,651 B2
(45) Date of Patent: Jul. 21, 2020

(54) ADJUSTABLE DOSING DISPENSERS AND METHODS FOR USING THE SAME

(71) Applicant: Silgan Dispensing Systems Corporation, Grandview, MO (US)

(72) Inventors: Sara D. Falcon, Richmond, VA (US); Kelly A. Harrigan, Richmond, VA (US); David L. Dejong, Ogden, UT (US); Eelco H. DeMan, Vlijmen (NL); Niels F. G. Van Wieringen, 's-Hertogenbosch (NL)

(73) Assignee: Silgan Dispensing Systems Corporation, Grandview, MO (US)

( * ) Notice: Subject to any disclaimer, the term of this patent is extended or adjusted under 35 U.S.C. 154(b) by 0 days.

(21) Appl. No.: 16/371,066

(22) Filed: Mar. 31, 2019

(65) Prior Publication Data
US 2019/0226895 A1    Jul. 25, 2019

Related U.S. Application Data

(62) Division of application No. 15/806,610, filed on Nov. 8, 2017, now Pat. No. 10,247,592, which is a division of application No. 14/807,956, filed on Jul. 24, 2015, now Pat. No. 9,846,066.

(51) Int. Cl.
| | |
|---|---|
| *B05B 11/00* | (2006.01) |
| *G01F 11/02* | (2006.01) |
| *B65D 83/00* | (2006.01) |
| *A47J 47/01* | (2006.01) |
| *B05C 17/00* | (2006.01) |
| *G01F 11/10* | (2006.01) |

(52) U.S. Cl.
CPC ............. *G01F 11/028* (2013.01); *A47J 47/01* (2013.01); *B05B 11/3011* (2013.01); *B05B 11/3012* (2013.01); *B05C 17/00* (2013.01); *B65D 83/0005* (2013.01); *G01F 11/10* (2013.01); *B05B 11/00412* (2018.08); *B05B 11/00416* (2018.08); *B05B 11/3016* (2013.01)

(58) Field of Classification Search
CPC ............. B05B 11/3011; B05B 11/3012; B05B 11/3015; B05B 11/00416; B05B 11/3074; B05B 11/3064; B05B 11/3008; G01F 11/10; G01F 11/028; G01F 11/023; G01F 11/02508; G01F 11/088; G01F 11/32; B65D 83/0005; A47J 47/01
USPC ............. 222/158, 309, 383.1, 207, 380, 256
See application file for complete search history.

(56) References Cited

U.S. PATENT DOCUMENTS

| | | |
|---|---|---|
| 1,929,564 A | 10/1933 | Rolph |
| 3,236,424 A | 2/1966 | Ward |
| 3,430,813 A | 3/1969 | Gilmont |

(Continued)

FOREIGN PATENT DOCUMENTS

WO    WO98/34732 A1    8/1998

*Primary Examiner* — Charles Cheyney
(74) *Attorney, Agent, or Firm* — Barlow, Josephs & Holmes, Ltd.

(57) ABSTRACT

Embodiments of the invention relate to dosing dispensers and in particular to dosing dispensers that may be operated using one hand by raising and filling a dosing chamber followed by lowering and dispersing a product from the dosing chamber and wherein the dose may be selected or adjusted and a user may visually confirm that the proper dose is being loaded and delivered by the dispenser.

15 Claims, 17 Drawing Sheets

(56) References Cited

U.S. PATENT DOCUMENTS

| | | | | |
|---|---|---|---|---|
| 3,527,551 A | * | 9/1970 | Kutik | B05B 11/007 417/560 |
| 4,072,247 A | | 2/1978 | Yamazaki | |
| 4,225,060 A | | 9/1980 | Kutik et al. | |
| 4,227,628 A | * | 10/1980 | Parsons | B05B 11/3015 222/380 |
| 4,273,257 A | | 6/1981 | Smith et al. | |
| 4,485,943 A | * | 12/1984 | Czech | B05B 11/3015 222/256 |
| 4,526,294 A | | 7/1985 | Hirschmann et al. | |
| 4,739,904 A | | 4/1988 | Spencer et al. | |
| 4,872,596 A | * | 10/1989 | Corsette | B05B 11/0048 222/380 |
| 4,890,773 A | | 1/1990 | Corsette | |
| 5,016,783 A | | 5/1991 | Hayes et al. | |
| 5,267,673 A | * | 12/1993 | Crosnier | B05B 11/007 222/321.7 |
| 5,301,845 A | | 4/1994 | Labonte | |
| 5,363,992 A | * | 11/1994 | Meshberg | B05B 1/1645 222/153.13 |
| 5,497,915 A | * | 3/1996 | Wass | B05B 11/3015 222/153.07 |
| 5,687,884 A | | 11/1997 | Bodin et al. | |
| 5,931,347 A | | 8/1999 | Haubrich | |
| 5,967,377 A | | 10/1999 | Glynn | |
| 6,012,613 A | | 1/2000 | Chen | |
| 6,155,066 A | | 12/2000 | Chandler et al. | |
| 6,164,498 A | | 12/2000 | Faughey et al. | |
| 6,443,331 B1 | * | 9/2002 | DeJonge | B05B 11/00 222/153.13 |
| 6,705,493 B1 | * | 3/2004 | Mijers | B05B 11/3015 222/321.7 |
| 7,886,941 B2 | * | 2/2011 | Pietrowski | B05B 11/007 222/494 |
| 8,939,323 B2 | * | 1/2015 | Knight | A61M 11/00 222/153.13 |
| 8,998,591 B2 | | 4/2015 | Han de Man | |
| 9,233,384 B2 | | 1/2016 | Greiner-Perth et al. | |
| 9,468,941 B2 | * | 10/2016 | Bruder | B05B 11/0008 |
| 9,789,502 B2 | | 10/2017 | Maddy | |
| 2003/0075567 A1 | * | 4/2003 | Santagiuliana | B05B 11/0094 222/380 |
| 2005/0072808 A1 | | 4/2005 | Kitamura | |
| 2005/0115984 A1 | | 6/2005 | Pritchett et al. | |
| 2010/0206910 A1 | | 8/2010 | Carta | |
| 2012/0024907 A1 | | 2/2012 | Law et al. | |
| 2014/0270897 A1 | | 9/2014 | Laurusonis et al. | |
| 2015/0122847 A1 | | 5/2015 | Pritchet | |

* cited by examiner

ADJUSTABLE DOSING DISPENSERS AND METHODS FOR USING THE SAME

CROSS-REFERENCE TO RELATED APPLICATIONS

This Application is a divisional application of U.S. application Ser. No. 15/806,610, filed Nov. 8, 2017, now U.S. Pat. No. 10,247,592, issued Apr. 2, 2019, which is a divisional application of U.S. application Ser. No. 14/807,956, filed Jul. 24, 2015, now U.S. Pat. No. 9,846,066, issued Dec. 19, 2017.

BACKGROUND OF THE INVENTION

Field of the Invention

Embodiments of the invention relate to dosing dispensers and more particularly to selectable dosing dispensers that may be primed and actuated with single-handed use.

State of the Art

The ability to dose or provide a specific dose of a product for a user is desirable. As a result, many different types of dosing dispensers and devices have been developed for everything from home cleaning products to healthcare products and medications. Such dosing dispensers come in many sizes, shapes, and forms.

One example of a dosing dispenser is a syringe. A syringe allows a user to draw a measured portion of a liquid or product into a body or barrel of the syringe for later dispensing. The body or barrel of the syringe may be marked with graduations to allow a user to measure or visually see the amount—or dose—of product that has been drawn into the syringe. In this way, a user may manually select an amount of product to collect and later dispense with the syringe.

Another example of a dosing dispenser is a measuring cup. A measuring cup having graduations marking specific doses may be filled to the desired dose and then emptied in a desired manner on a desired surface or into a receptacle.

While other dosing dispensers and devices exist, improvements are desired. For example, many of the dosing dispensers may not be operated with one hand. In the case of the syringe, a user must hold the syringe, immerse the opening of the syringe into the liquid to be loaded into the syringe, and pull the plunger to load the syringe. At times, this must also be done while holding a bottle containing the product to be used. For instance, many children's medications utilize syringes as a dosing device to allow a caregiver to administer a proper dosage of medicine to a child. In use, the syringe must be inserted into a bottle of the medicine and the syringe plunger raised to load the syringe. The caregiver must hold the bottle—or secure it in a non-movable position on a surface—while keeping the syringe inserted sufficiently in the bottle to ensure that product is loaded into the syringe while the syringe plunger is moved. This requires two hands. In addition, as the bottle of medicine is used up, the syringe must be inserted further into the bottle to acquire product. With children's medicine, this often means that the dose graduations on the syringe are within the bottle and are not visible to the caregiver. The caregiver must therefore guess at when they have reached the correct dose and pull the syringe out and check or draw too much medicine into the syringe and then push the extra back into the bottle or container, risking contamination of the medicine.

BRIEF SUMMARY OF THE INVENTION

According to various embodiments of the invention, a dispensing system may include a dispenser and a container having a product therein. The dispenser may be configured to include a dosing chamber that may be filled and emptied to distribute a dose of product from the container to a desired location. In some embodiments, a dosing chamber may be filled by raising a dispenser head that partially defines the dosing chamber to a predetermined height. A dose contained within the dosing chamber may be distributed or delivered by pushing on the dispenser head—or applying a force to the dispenser head—which thereby pushes the dose of product out of the dispenser.

According to some embodiments of the invention, a dispenser includes a dispenser head includes having a lever associated therewith. A valve system within the dispenser allows product to flow into a dosing chamber defined by an interior of the dispenser head when the dispenser head is raised or moved by a user. In some embodiments, a user may apply a force to the lever to move the dispensing head. When a user applies an opposite force to the lever or the dispenser head, the valving system allows product to be dispensed from the dosing chamber or from within the dispenser in an amount substantially equivalent to the amount of product that was drawn into the dosing chamber.

In certain embodiments of the invention, a cap may be fitted over a portion of a dispenser head of a dispenser. The cap may include one or more lever paths along which a lever associated with a dispenser head may travel when moved by a user. The one or more lever paths may have different lengths such that each lever path defines a dosage amount or allows only that dosage amount into a dosing chamber. For example, a first lever path may be half as long as a second lever path. The first lever path allows the dispenser head to travel a first distance and fill the dosing chamber with a dose having a first volume. When the lever of the dispenser head is aligned with the second lever path and the dispenser head is moved to fill the dosing chamber, a second distance is traveled and the dosing chamber is filled with a dose having a second volume. The lever paths may be configured such that the first and second doses are for a child and an adult, respectively, or such that the second dose is exactly double the first dose. Other configurations may also be used such that a user may customize the dosage amount based upon the desired use or desired dose of product required from the dispenser.

In some embodiments of the invention, a dispenser may include a base, a seal seated on the base and having a fluid flow path therethrough, a dispenser head seated over the seal and part of the base, a valve sleeve and a valve seated in the valve sleeve, the valve having both an inlet and an outlet valve. A dosing chamber may be defined by an interior space between the dispenser head and the seal. Product may be drawn into the dosing chamber through the fluid flow path in the seal and then dispensed back through the fluid flow path as the volume of the dosing chamber is reduced. In certain embodiments of the invention, the volume in the dosing chamber is altered by movement of the dispenser head relative to the seal and the base. When the dispenser head is drawn away from the base, the inlet valve may open or unseat, allowing product to flow into the dosing chamber. Upon movement of the dispenser head towards the base, the inlet valve may be reseated and the outlet valve opened, allowing product to flow out of the dispenser.

According to various embodiments of the invention, a dispenser may be used with either an airless or a vented system. In an airless system, a piston may be used with a container to provide the necessary follower-piston for the product in a container. In other airless systems, a pouch or bag may be attached to the dispenser. In vented systems, a dispenser may be used with a dip-tube or other conduit for providing or delivering a product to the dispenser for use and dispensing of the product.

BRIEF DESCRIPTION OF THE DRAWINGS

While the specification concludes with claims particularly pointing out and distinctly claiming particular embodiments of the invention, various embodiments of the invention can be more readily understood and appreciated by one of ordinary skill in the art from the following descriptions of various embodiments of the invention when read in conjunction with the accompanying drawings in which:

DETAILED DESCRIPTION OF THE INVENTION

According to various embodiments of the invention, a dispenser may be loaded and actuated by a user to dispense a particular dose of fluid or other product. In some embodiments of the invention, the loading, dosing, and actuation of the dispenser may be accomplished using one hand. In various embodiments, the dispenser may be used with a venting container and in other embodiments it may be used with a non-venting container or an airless container system.

Figure 1:
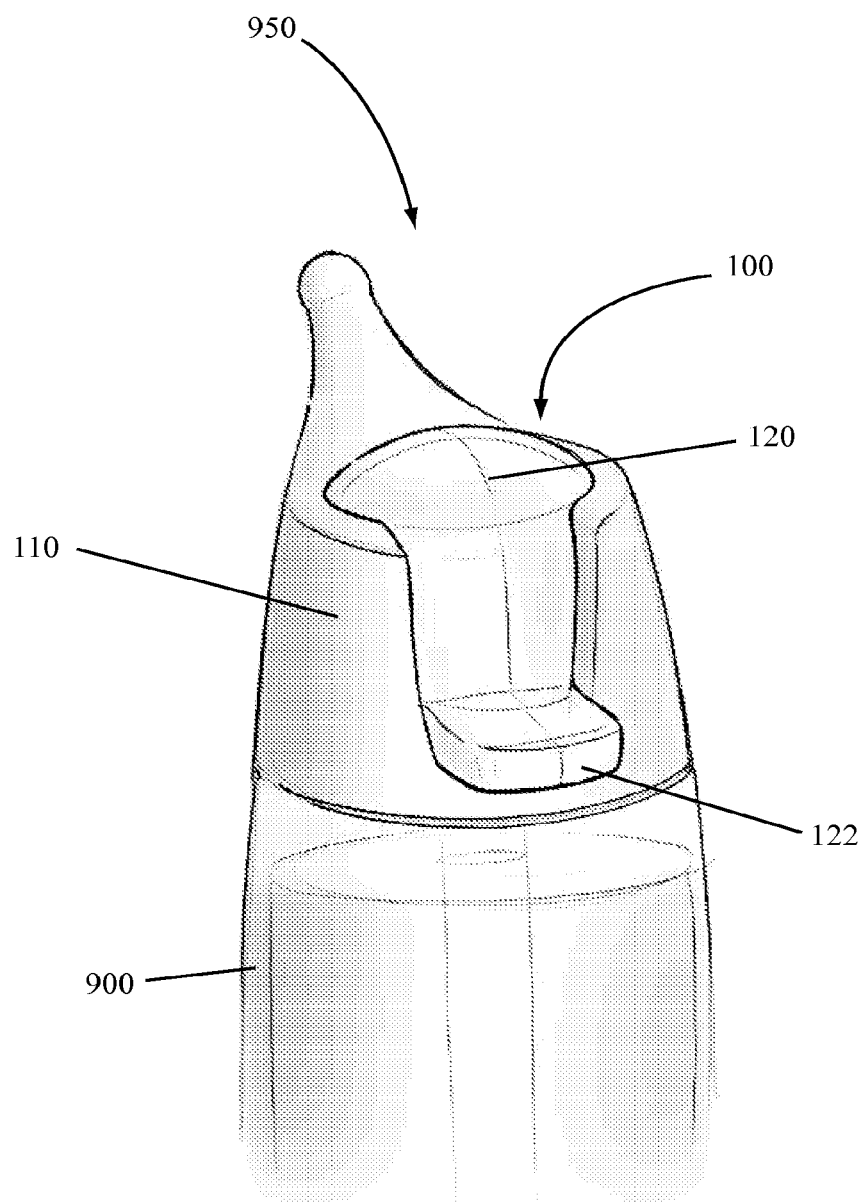
FIG. 1 illustrates a dosing dispenser according to various embodiments of the invention.
Figure 2:
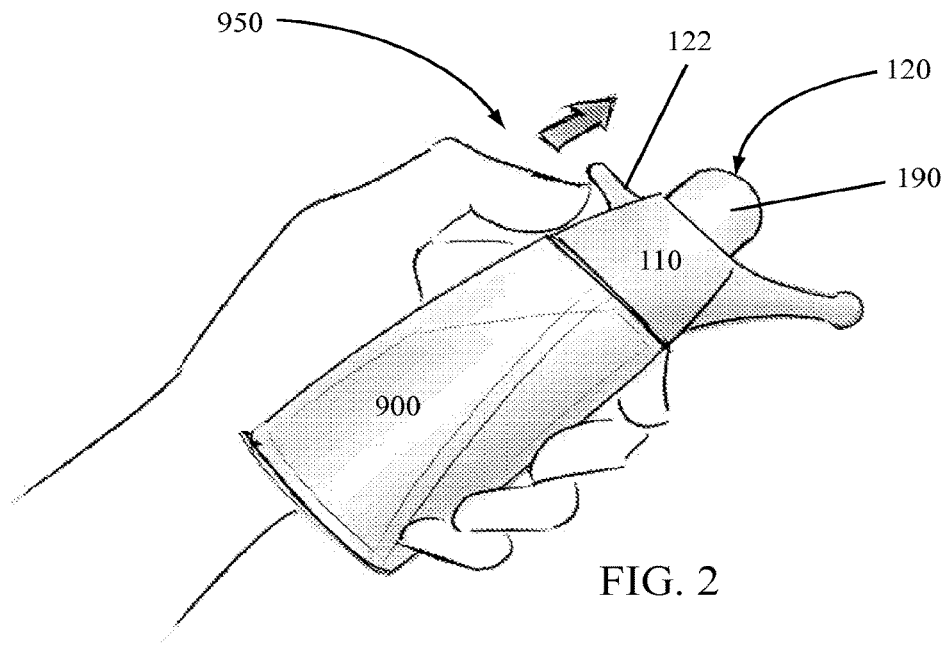
FIG. 2 illustrates a user actuating a dosing dispenser according to various embodiments of the invention.
Figure 3:
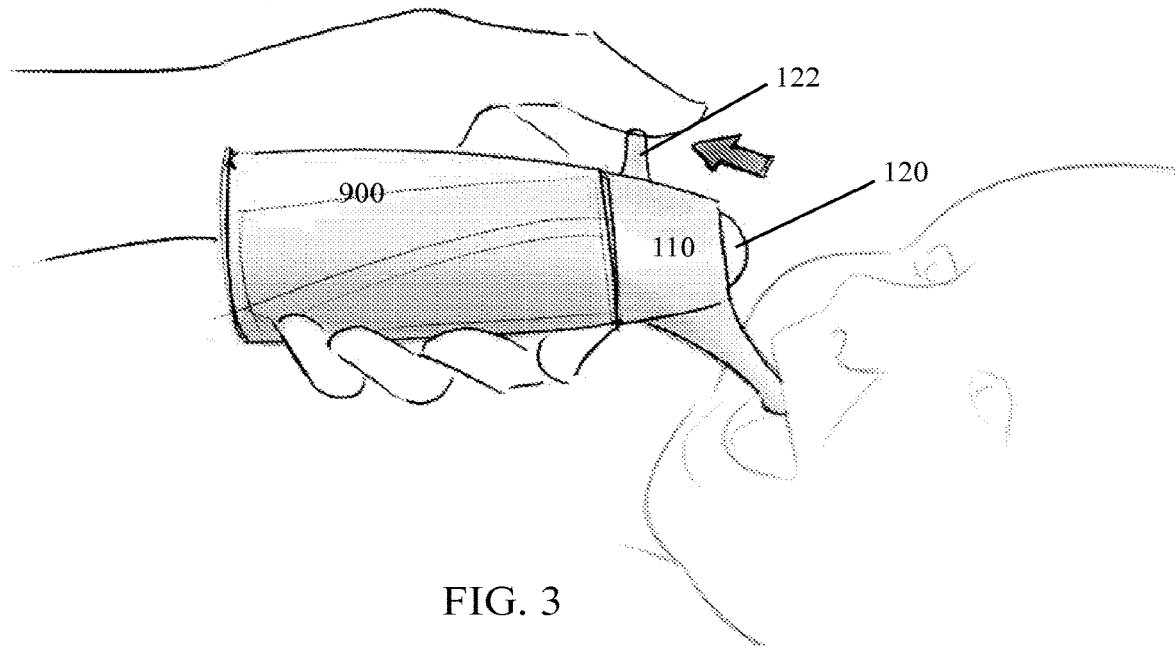
FIG. 3 illustrates a user dispensing a product from a dosing dispenser according to various embodiments of the invention.

A dispenser 100 according to certain embodiments of the invention is illustrated in FIGS. 1 through 3. As illustrated, a dispenser 100 may include a shroud 110 and a dispenser head 120. The dispenser head 120 may include a lever 122 as illustrated. In other embodiments, the lever 122 may be a separate component but in communication with the dispenser head 120 such that the lever 122 may be used to move the dispenser head 120.

The dispenser head 120 may be movable with respect to the shroud 110. For example, as illustrated in FIG. 2, a user may push on or apply a force to the lever 122 to move the dispenser head 120 away from the top of the shroud 110. As illustrated in FIG. 3, the dispenser head 120 may be moved downward—or towards the shroud 110—by a user applying a force to the lever 122. Alternatively, a user may apply a force directly to the top of the dispenser head 120 to push the dispenser head 120 back towards the shroud 110.

As illustrated in FIGS. 1 through 3, a dispenser 100 according to various embodiments of the invention may be attached to a container 900 containing a product, such as a liquid or fluid. In some embodiments the shroud 110 may attach to the container 900 while in other embodiments a base of the dispenser 100 may attach to the container 900 to retain the dispenser 100 on the container 900 and hold the shroud 110.

According to certain embodiments of the invention, a dispensing system 950 including a dispenser 100 and a container 900 attached thereto may be operated by a user with one hand. As illustrated in FIG. 2, a user may apply a force to the lever 122 to raise the dispenser head 120 or move it away from the shroud 110. As the dispenser head 120 moves away from the shroud 110, a dosing chamber 190 on an interior of the dispenser head 120 may fill with product pulled from the container 900 into the dosing chamber 190. Upon reaching the desired dose, a user may cease applying force to the lever 122 such that the dispensing device 950 is ready to dispense the dose of product contained in the dosing chamber 190 or an equivalent dose thereof.

As illustrated in FIG. 3, a user may apply a downward force—or force directed at the shroud 110—to the lever 122 to move the dispenser head 120 back towards the shroud 110. As the dispenser head 120 moves towards the shroud 110, the product contained in the dosing chamber 190 may be pumped, pushed, or otherwise dispensed from the dispensing device 950 onto a surface, into a receptacle, or into a patient's mouth as illustrated. In some embodiments of the invention, the dose of product may be dispensed through a nozzle or spout that is part of the shroud 110 or is attached to the shroud 110. For example, as illustrated in FIG. 3, a nozzle of the dispenser 100 may be inserted in a baby's mouth and the dispenser head 120 moved to dispense a dose of product into the baby's mouth.

According to certain embodiments of the invention, the dispenser head 120 may be constructed of a transparent, semi-transparent, or clear material such that a user may visually confirm that a product has entered the dosing chamber 190 upon use of the dispensing device 950. In some embodiments, the dispenser head 120 may also include one or more markings, graphics, or graduations marked on the dispenser head 120 such that a user may visually adjust the dose within the dosing chamber 190 to the desired dose. For example, the dispenser head 120 may include graduations representing 5 mL, 10 mL, and 15 mL. If a user desires 5 mL of a product, the user may move the lever 122 until the dosing chamber 190 is filled to the 5 mL mark. If a user wished to have 15 mL of a product, the dispenser head 120 could be move away from the shroud 110 until 15 mL of product filled the dosing chamber 190 as evidenced by graduated markings on the dispenser head 120.

As an alternative to markings—or a secondary feature to be used with markings—certain embodiments of the invention may include locks to restrict movement of the dispenser head 120 through a limited range of motion such that a defined dose may be filled in the dosing chamber 190. For example, a restriction may prevent lever 122 from moving up past that point at which 5 mL of product fills the dosing chamber 190. The restriction may be moved for other dosing requirements such that 10 mL or 15 mL or other desired amount could fill the dosing chamber 190.

The dispenser 100 according to various embodiments of the invention illustrated in FIGS. 1 through 3 is illustrated in use with a venting system that includes a dip-tube for delivering product from within the container 900 to the dispenser 100. In such systems, air is allowed back into the container 900 to replace the space from which the fluid or product was removed. While a dispenser 100 according to various embodiments of the invention may work with a venting system, a dispenser 100 may also work with an airless or non-venting system as illustrated in FIGS. 4 and 5.

Figure 4:
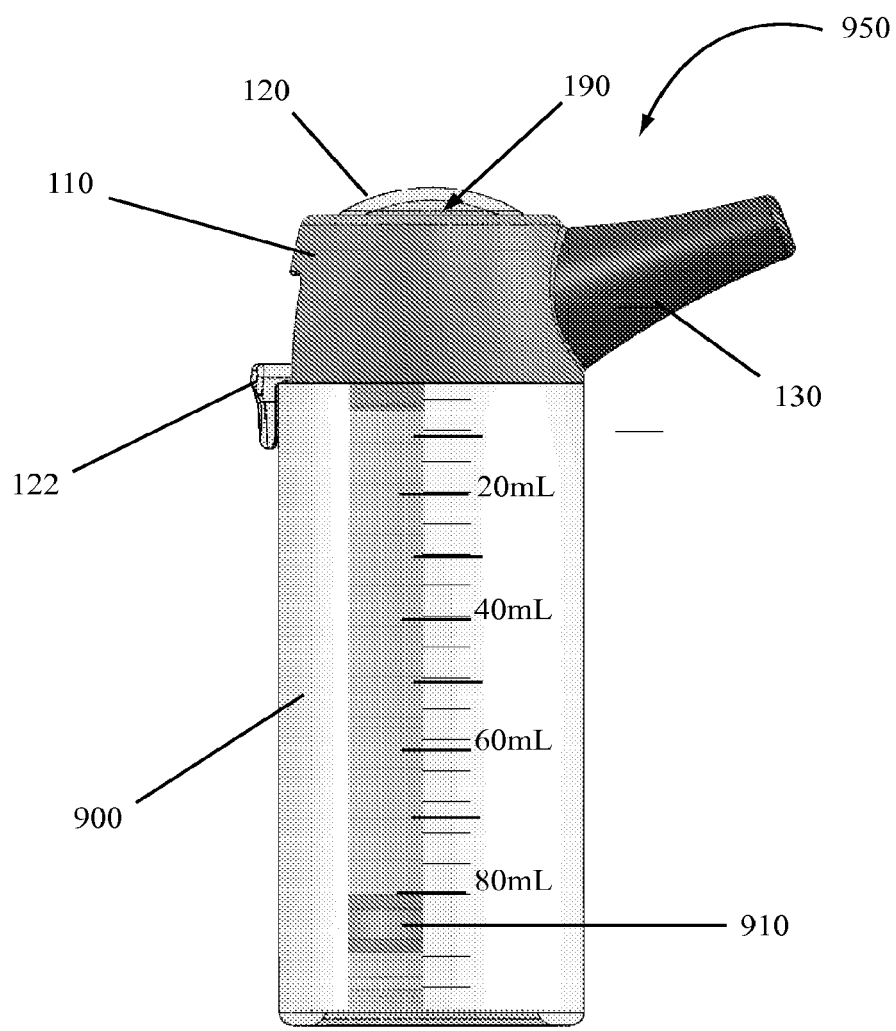
FIG. 4 illustrates a dispenser and dispensing system according to various embodiments of the invention.

As illustrated in FIG. 4, the dispensing system 950 may include a dispenser 100 mounted on or attached to a container 900. The container 900 may include a piston 910 contained piston within the container 900. As the dispenser 100 is actuated and product is removed from the container 900, the piston 910 may move up the interior container 900 walls allowing the displacement of fluid from the interior of the container 900 through the dispenser 100. Such airless dispensing systems are known and used with other types of dispensers and pumps.

The dispensing system 950 illustrated in FIG. 4 is at rest or in a non-loaded and non-actuated state. Upon the application of a generally upward force—or force away from the container 900—to the lever 122 by a user, the dispensing head 120 may be raised or moved to the position illustrated in FIG. 5, filling the dosing chamber 190 with a product from container 900. As product fills the dosing chamber 190, the piston 910 moves up the walls of the container 900. In some embodiments of the invention, the container 900 may include clear or opaque walls or a window in a portion of the container 900 along with graduations or other markings to represent doses or an amount of product in the container 900. For example, as illustrated in FIGS. 4 and 5, the container 900 may include graduation markings showing the volume of product in the container in mL or other volume or unit. As illustrated in FIG. 5, when the dosing chamber 190 is filled, the amount of product removed from the container 900 and into the dosing chamber 190 is 10 mL as represented by movement of the piston 910 marking 80 mL in FIG. 4 and 70 mL in FIG. 5.

Figure 5:
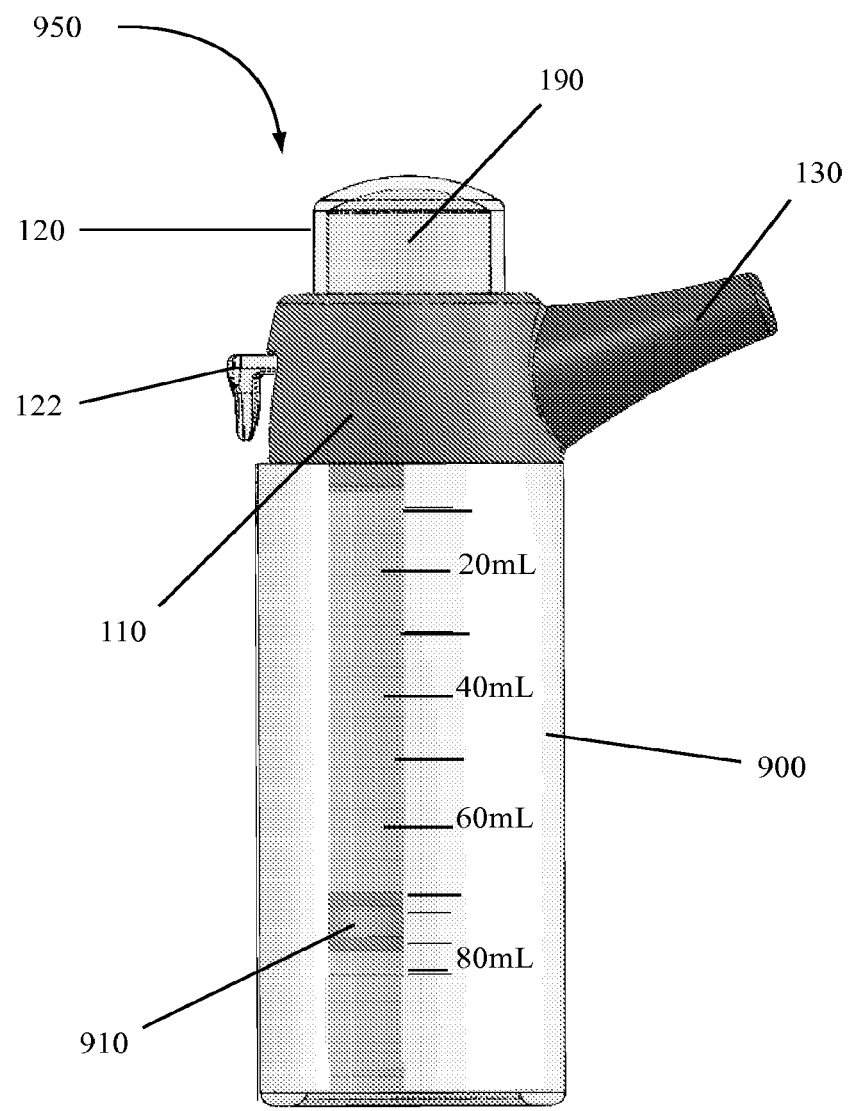
FIG. 5 illustrates a dispenser and dispensing system according to various embodiments of the invention.

A user may dispense the product from the dosing chamber 190 illustrated in FIG. 5 by applying a downward force against the lever 122 to push the lever 122 towards the container 900 which moves the dispenser head 120 towards the shroud 110 and dispenses the product from the dosing chamber 190 through the spout 130. In other embodiments, a user may apply a downward force directly against a top surface of the dispenser head 120 to push the dispenser head 120 towards the shroud 110 and container 900. Application of such force pushes product out the spout 130.

Figure 6:
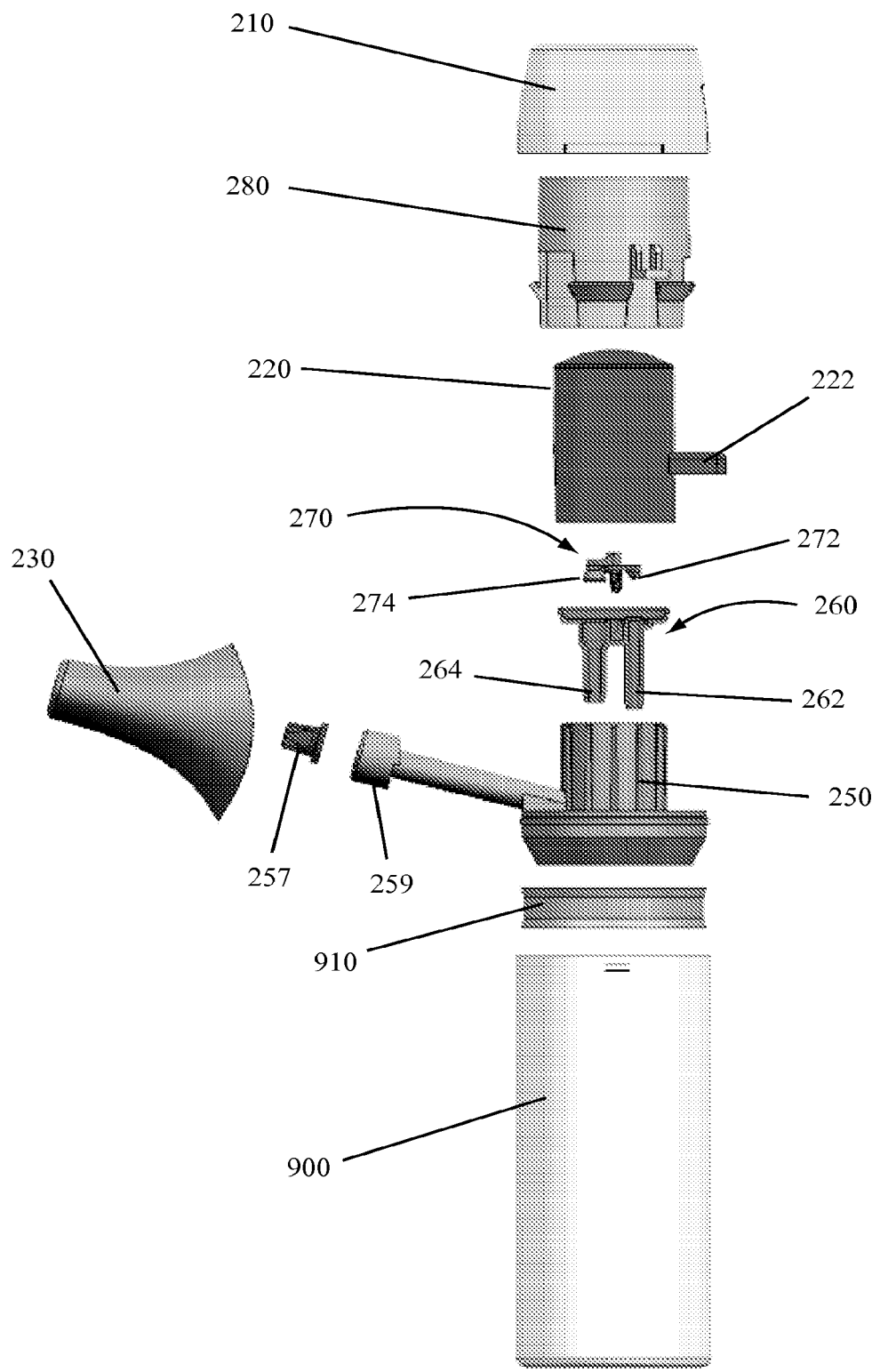
FIG. 6 illustrates the components of a dispenser and dispensing system according to various embodiments of the invention.
Figure 7:
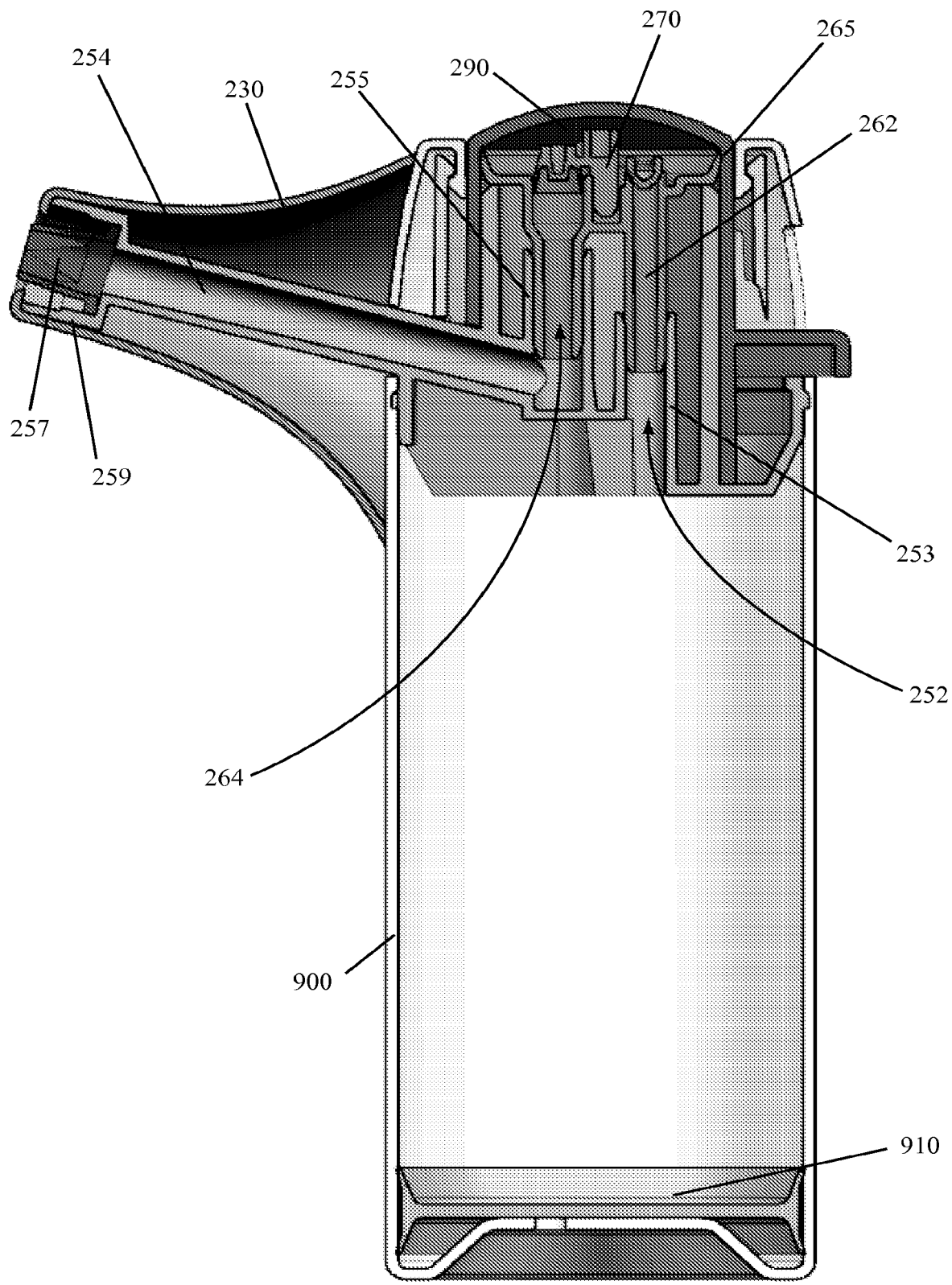
FIG. 7 illustrates a cross-sectional view of a dispenser and dispensing system according to various embodiments of the invention.
Figure 8:
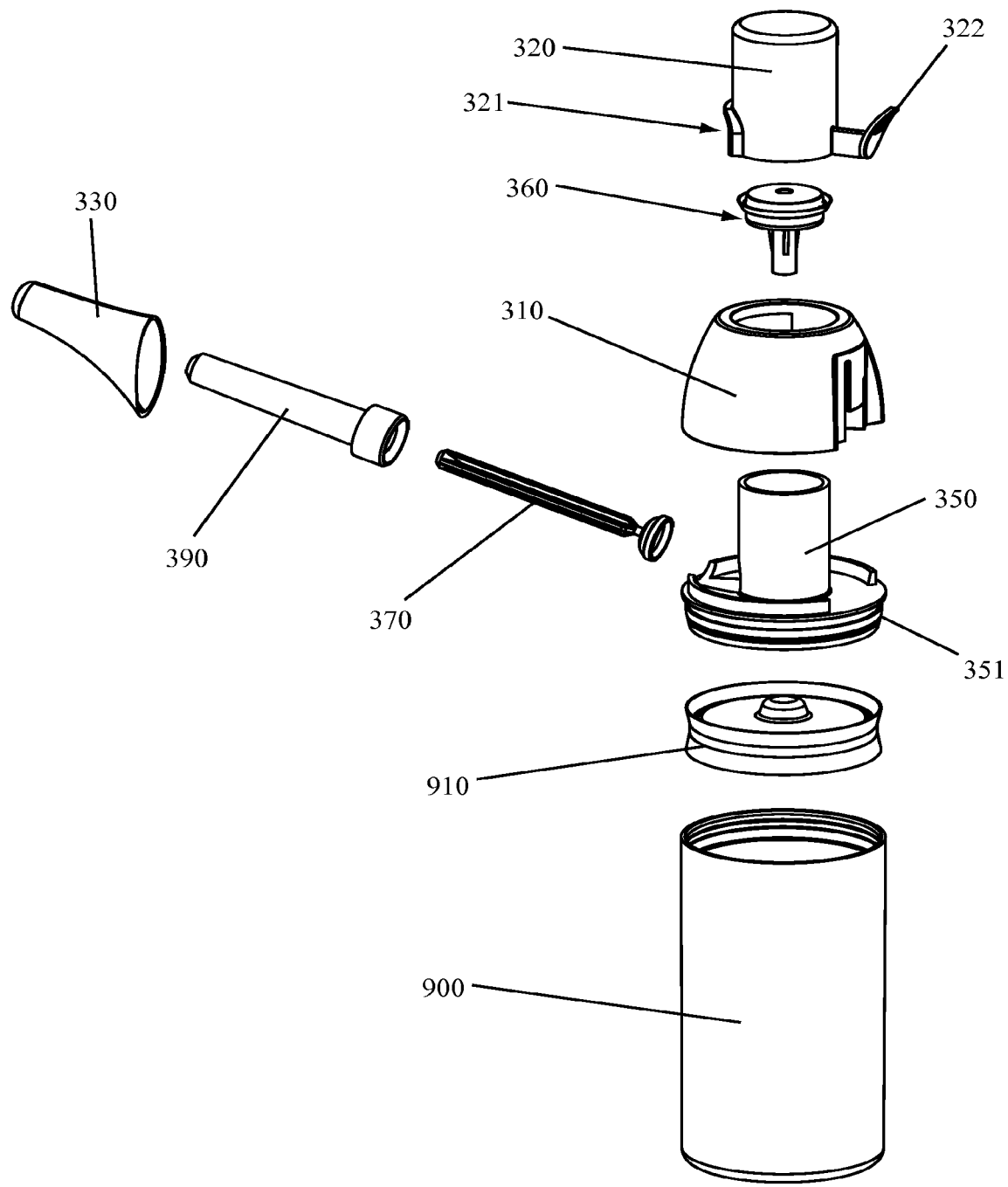
FIG. 8 illustrates the components of a dispenser and dispensing system according to various embodiments of the invention.

A dispenser 200 and dispensing system 950 according to other embodiments of the invention are illustrated in FIGS. 6 through 8. As illustrated in FIG. 6, a dispensing system 950 may include the components of a dispenser 200 along with a container 900 and piston 910 for an airless dispensing system.

A dispenser 200 according to certain embodiments of the invention may include a base 250, a valve seat 260, a valve 270, a dispenser head 220, a lock cylinder 280, a shroud 210 and a spout 230. An optional spout valve 257 may also be used with various embodiments of the invention.

A base 250 according to various embodiments of the invention may include one or more features capable of mating with or connecting to a container 900. According to some embodiments of the invention and as illustrated in FIG. 7, a bead seal may snap into a channel in a container 900 to retain the base 250 and the dispenser 200 on the container 900. Other features or methods could also be used, for example, a screw closure system having threads on the base 250, container 900, or both may be used. In other embodiments a bayonet closure system could be used with lugs on the base 250, container 900, or both. Different methods and configurations for mating and connecting a pump or dispenser base to a container are known and any such method or features may be utilized with various embodiments of the invention.

As illustrated in FIG. 7, a base 250 may include an inlet path 252 and an outlet path 254. Product or fluid from within a container 900 attached to the base 250 may flow into the inlet path 252 and out the outlet path 254 during operation of the dispenser 200. A base 250 may also include an orifice 259 at an end of the outlet path 254. The orifice 259 may be configured to dispense a product in a desired shape, through a desired opening, or to retain an optional spout valve 257 at the end of the outlet path 254. The inlet path 252 and outlet path 254 may also be configured to mate with other components of the dispenser 200.

A valve seat 260 according to various embodiments of the invention is illustrated in FIG. 7. As illustrated, the valve seat 260 may include a top disc portion having a seal edge 265 about a periphery of the disc. The seal edge 265 may abut against and seal with an interior wall of the dispenser head 220 as illustrated. An inlet tube 262 and an outlet tube 264 may extend off of a portion the disc, providing flow paths for a product in the dispenser 200. The inlet tube 262 may include an inlet valve seat portion at the point that the inlet tube 262 meets the disc and the outlet tube 264 may include a outlet valve seat portion at the point where the outlet tube 264 interfaces with the disc. A valve retention portion 267 may be integrated with the valve seat 260 to retain one or more valves 270 on the valve seat 260.

As illustrated in FIG. 7, the valve seat 260 may mate with or connect to the base 250. An outer rim of the disc may sit or rest on a portion of the base 250 and the seal edge 265 may extend up and away from the portion of the outer rim of the disc contacting the base 250. An inlet tube 262 and an outlet tube 264 may extend from the disc of the valve seat 260 towards the base 250 to connect with or join with the base 250. In some embodiments of the invention, the inlet path 252 of the base 250 may be at least partially defined by an inlet path tube 253 or may mate with the inlet path tube 253 such that product may flow from the inlet path 252 into the inlet path tube 253. The inlet tube 262 of the valve seat 260 may fit within the inlet path tube 253 of the base 250 and seal therewith to allow product to flow through the inlet path tube 252 and into the inlet tube 262 as illustrated in FIG. 7. Similarly, a portion of the outlet path 254 of the base 250 may be defined by an outlet path tube 255 or may mate therewith. The outlet tube 264 of the valve seat 260 may fit within the outlet path tube 255 and seal therewith, forming a flow channel for product from the dosing chamber 290 into the outlet path 254 of the base 250. While the inlet tube 262 and outlet tube 264 of the seal valve 260 are illustrated in FIG. 7 as being inside of the inlet path tube 253 and outlet path tube 255 of the base 250, it is understood that the connections could be reversed or configured as desired to create the required seals and sealing surfaces to allow the dispenser 200 to operate appropriately.

A valve 270 including an inlet valve 272 and an outlet valve 274 may be seated in, attached to, mated with, or fixed to the valve seat 260. As illustrated in FIGS. 6 and 7, the inlet valve 272 and outlet valve 274 may be part of a singular valve unit. In other embodiments of the invention, an inlet valve 272 and an outlet valve 274 may be separate components attached to or otherwise seated against the valve seat 260. The inlet valve 272 may seat against a valve seat at the intersection of the inlet tube 262 with the top disc portion of the valve seat 260 such that the inlet valve 272 acts as a valve to restrict flow of a product out of the inlet tube 262. The outlet valve 274 may seat against a valve seat at the intersection of the outlet tube 264 with the valve seat 260 disc.

As illustrated in FIG. 7, the valve 270 may include an inlet valve 272 seated in the inlet valve seat portion at the intersection of the inlet tube 262 with the valve seat 260 disc portion and an outlet valve 274 seated in the outlet valve seat portion at the intersection of the outlet tube 264 with the valve seat 260 disc portion. The inlet valve 272 may disengage from the inlet valve seat to allow product to flow through the inlet path tube 252, the inlet tube 262, and into a dosing chamber 290 formed by the intersection of the dispenser head 220 with a seal edge 265 of the valve seat 260. Upon retaining or loading a dose of product into the dosing chamber 290, the inlet valve 272 may again seat on the inlet valve seat. Application of a force to the dispenser head 220—by pushing on a portion of the dispenser head 220 or using a lever 222 associated with the dispenser head 220—may open the outlet valve 274 or unseat the outlet valve 274 from the outlet valve seat such that product may flow out of the dosing chamber 290 and into the outlet tube 264.

A dispenser head 220 may be mounted to or assembled with a base 250 and valve seat 260 as illustrated in FIG. 7. A lever 222 integrated with the dispenser head 220 or attached thereto may extend outward from the dispenser 200 as illustrated. In some embodiments of the invention, the lever 222 may extend at a right angle to the dispenser head 220 and in other embodiments it may be configured at an angle to provide an ergonomic position for a user to utilize the dispenser 200 with one hand.

According to various embodiments of the invention, a dispenser head 220 may be of any desired shape. As illustrated, a dispenser head 220 may include a tubular shape having a first, closed end and a second, opposite, open end. The open end of the dispenser head 220 may fit over portions of an assembled base 250 and valve seat 260. A seal edge 265 about a periphery of the valve seat 260 may contact and seal against an interior surface of the dispenser head 220. A space or volume between the closed end of the dispenser head 220 and the valve seat 260 may define a dosing chamber 290 into which product may flow. A dosing chamber 290 may have a varying volume depending upon the movement of the dispenser head 220. When the dispenser head 220 is closest to the container 900 as illustrated in FIG. 7, the dosing chamber 290 may have a first volume. As the dispenser head 220 is moved away from the container 900, the volume of the dosing chamber 290 increases. When the dispenser head 220 is moved away from the container 900 a second volume may exist in the dosing chamber 290 which second volume is greater than the first volume. As illustrated in FIG. 7, a dispenser head 220 in a non-actuated state may rest on a portion of the base 250 such that the base 250 prevents further movement of the dispenser head 220 towards the bottom of the container 900. In some embodiments, a dispenser head 220 may also include one or more features to help retain the dispenser head 220 within the base 250 when assembled. For example, a snap bead may prevent movement of the dispenser head 220 vertically away from the bottom of the container 900 past a pre-determined position.

According to certain embodiments of the invention, a lock cylinder 280 may be assembled over a dispenser head 220 to retain or help retain the dispenser head 220 in a proper position within the dispenser 200. As illustrated in FIGS. 6 and 7, a dispenser head 220 may be assembled to the base 250 and a lock cylinder 280 assembled over the dispenser head 220 to retain the dispenser head 220 on the dispenser 200. A lock cylinder 280 according to certain embodiments of the invention may include locking features configured to mate with the base 250 or locking features on the base 250 such that the locking cylinder 280 may be locked to or snap fit to the base 250, retaining the valve seat 260 and dispenser head 220 on the base 250.

A shroud 210 may be fitted over the lock cylinder 280 for aesthetic purposes, to hold the lock cylinder 280 in place, or for other purposes. The shroud 210 may also assist retaining the dispenser head 220 on the dispenser 200 in some embodiments of the invention. A shroud 210 according to various embodiments of the invention may include a tubular-like structure or shape having two open ends. A first end may fit over the lock cylinder 280 and a second end may provide an opening in the top of the dispenser 200 in which a portion of the dispenser head 220 is visible and through which the dispenser head 220 may move during actuation of the dispenser 200. In other embodiments of the invention, the shroud 210 may include one or more stop limits for the lever 222 such that the one or more stop limits may limit the upward mobility of the lever 22 and in turn the dispenser head 220. By limiting the movement of the dispenser head 220 with a stop limit, the volume in the dosing chamber 290 may be limited such that only a desired dose is pulled into or pumped into the dosing chamber 220.

In other embodiments of the invention, a lock cylinder 280 may include one or more stop limits. The one or more stop limits may restrict the movement of a lever 222 and thus the dispenser head 220 such that the stop limit dictates the amount of product drawn into or pumped into the dosing chamber 290 during use of the dispenser 200.

In still other embodiments of the invention, both a shroud 210 and a lock cylinder 280 may include features that define one or more stop limits capable of restricting movement of a lever 222. In still further embodiments, a shroud 210, lock cylinder 280, or both may include features that limit the movement of the dispenser head 220 and in turn a lever 222 associated therewith. For example, a dispenser head 220 may include one or more projections that may contact one or more stop limits or projections incorporated into the shroud 210, lock cylinder 280, or both. Such interaction may stop the movement of the dispenser head 220 and thus the continued filling of the dosing chamber 290.

A dispenser 200 according to various embodiments of the invention may also include a spout 230. A spout 230 may fit over, connect to, or contact a portion of the base 250 and shroud 210 as illustrated in FIG. 7. According to certain embodiments of the invention, a spout 230 may provide a surface configured and shaped to allow dispensing of a product into the mouth of a user or person the user is interacting with. For instance, as illustrated in FIGS. 6 and 7, a spout 230 may be shaped to allow a user or subject to put their lips about the spout 230 so that a product could be delivered from the dispenser 200 to the user or subject.

According to some embodiments of the invention, a spout 230 may be detached from the dispenser 230 for cleaning or sanitizing. In addition, different sized spouts 230 may be used to account for different sized mouths of users or subjects. For example, in some embodiments a dispenser 200 may be sold with multiple spouts 230 having different sizes. A spout 230 may be selected and snap-fit or otherwise connected to the dispenser 200 about an orifice 259 associated with the base 250. A user may obtain a dose of product by moving lever 222 to fill the dosing chamber 290 with a desired dose of product. The spout 230 may then be put in the mouth of the user or a subject that the user is assisting and the dispenser head 220 or lever 222 pressed to deliver a product through the outlet path 254, the orifice 259, and into a user's or subject's mouth, or other dispensing vessel. Following use, the spout 230 could be removed and washed before the next use. In other embodiments of the invention, a spout 230 may be disposable, such that it is removed and discarded after one use. In still other embodiments, the spout 230 may be washed while attached to the dispenser 200, for example by running the spout 230 under hot water.

In some embodiments of the invention, an orifice 259 may be fitted with a spout valve 257. A spout valve 257 may provide an additional valve at the end of the outlet path 254 capable of shutting off the flow of a product through the outlet path 254. Thus, as product is dispensed through the spout valve 257, the flow will stop and the spout valve 257 will shut once a desired dose has been pushed through the dispenser 200 or when pressure on the discharge head 220 ceases. A spout valve 257 may include any type of valve as desired. In some embodiments of the invention, a duck-bill-type valve may be used as a spout valve 257.

In addition to assisting with the stoppage of flow of a product, a spout valve 257 may provide peace-of-mind or more sanitary cleaning of the spout 230 and the dispenser 200. For instance, a dispenser 200 fitted with a spout valve 257 may include a spout 230 that remains fixed to the dispenser 200 and a user may wash the spout 230 under warm water without worry of contamination or backflow of water into the dispenser 200 because the spout valve 230 may prevent such backflow or contamination of residual product in the outlet path 254.

A dispenser 200 according to various embodiments of the invention may be assembled with the parts illustrated in FIG. 6. In some embodiments, a valve seat 260 may be seated on a base 250. A valve 270 may be fitted or secured to the valve seat 260. A dispenser head 220 may be fitted over the valve seat 260 and onto the base 250 with a lock cylinder 280 assembled over the dispenser head 220. The lock cylinder 280 may secure the dispenser head 220 to the base 250 such that the dispenser head 220 may move relative to the base 250 and lock cylinder 280. A shroud 210 may be fitted over the lock cylinder 280. An optional spout valve 257 may be inserted into the orifice 259 of the base 250. A spout 230 may be fit over a portion of the base 250, with an opening in the spout 230 about the orifice 259 of the base 250.

The assembled dispenser 200 may be attached to a container 900 as illustrated in FIG. 7, forming a dispensing system 950. In most instances, the container 900 may already have a piston 910 installed therein and the container 900 may be filled with a product. In other instances, the container may not include a piston 910 but the base 250 may be connected to a dip tube capable of transferring a product from the inside of the container 900 into the dispenser 200. In some embodiments of the invention, the dispenser 200 and container 900 with piston 910 may be shipped as a complete unit such that a pharmacist may mix a formulary product, add it to the container 900 and assemble the dispenser 200 for use by a customer.

A dispensing system 950 according to other embodiments of the invention is illustrated in FIGS. 8 through 22. Various components of a dispensing system 950 according to certain embodiments of the invention are illustrated in FIG. 8. For example, a dispensing system 950 may include a container 900 and piston 910 combination attached to a dispenser 300 having a base 350, a cap 310, a seal 360, a dispenser head 320, a valve 370, a valve sleeve 392, and a spout 330.

While a dispensing system 950 may include a container 900 and piston 910 for airless applications and formulations as illustrated in FIG. 8, other embodiments of the invention may include a container 900 that may be fitted to a dispenser 300 having a dip tube included therewith. A dispenser 300 having a dip tube may be used with formulations that are not sensitive to contamination by air or the atmosphere. A dispenser 300 may be connected to a container 900 by one or more connection points. For example, as illustrated in IG. 8, a container 900 may include one or more container projections 951 that may mate with one or more base projections 351 to form a connection between the base 350 and the container 900. In some embodiments of the invention, the container projections 951 and base projections 351 may include threads to allow the base 350 to be screwed onto the container 900. In other embodiments, the container projections 951 and base projections 351 may be snap-fit type projections that allow the base 350 to be snap-fit to the container 900. In still other embodiments of the invention, the base projections 351 and container projections 951 may include a bayonet-type closure system allowing the base 350 to be fixed to the container 900 in either a removable or non-removable configuration. Depending on the application, the base 350 and container 900 may be configured to be separable or inseparable upon initial joinder of the two parts.

Figures 21, 22:
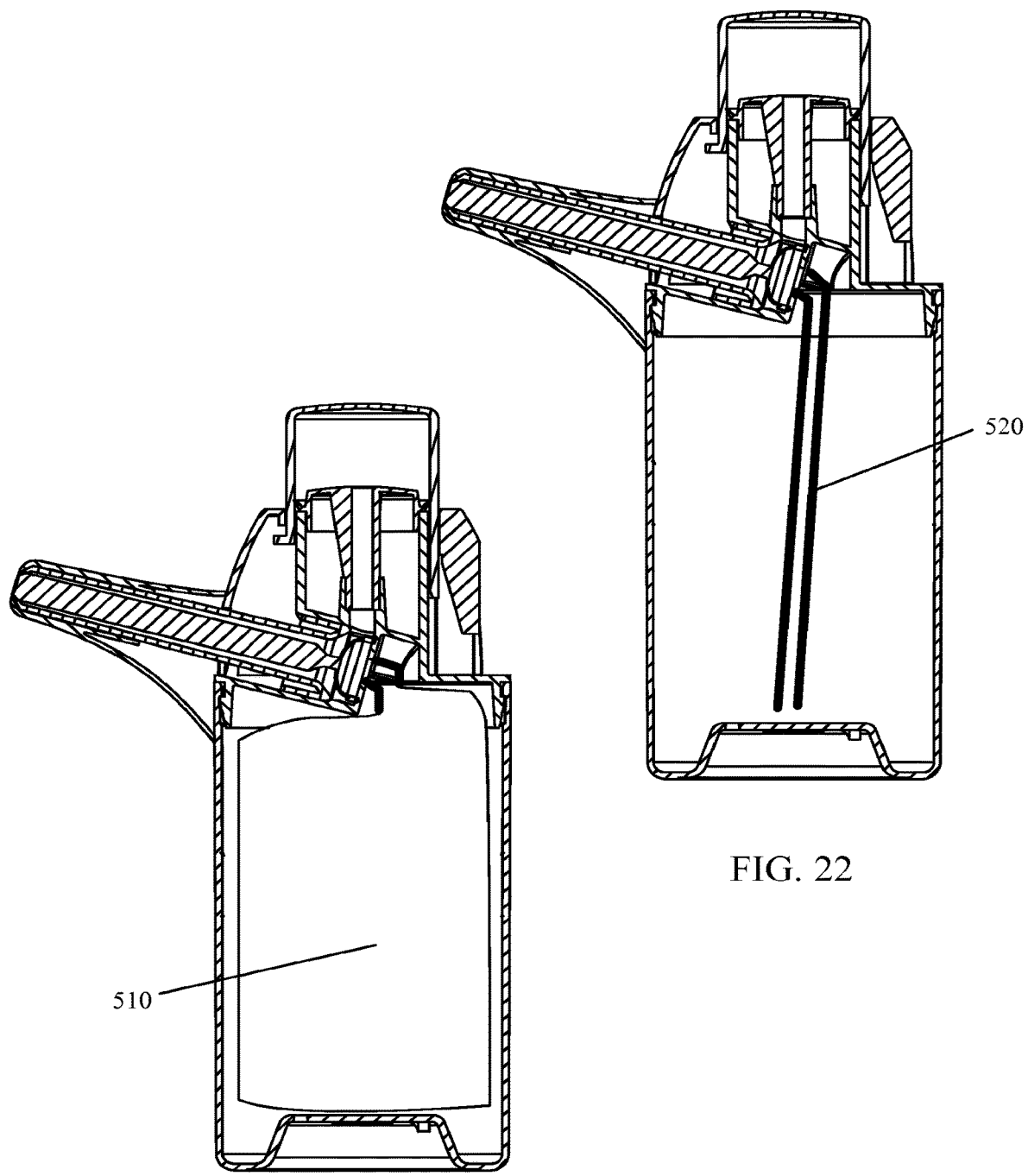
FIG. 21 illustrates a cross-sectional view of a dispensing device according to various embodiments of the invention.
FIG. 22 illustrates a cross-sectional view of a dispensing device according to various embodiments of the invention.

In still other embodiments of the invention, a base 350 may be connected to a pouch 510 or bag filled with product as illustrated in FIG. 21. The pouch 510 or bag may be inserted into a container 900 and the base 350 secured on the container 900 such that the pouch 510 or bag is contained within the container 900.

Components of a dispenser 300 according to various embodiments of the invention are illustrated in an unassembled state in FIG. 8. As illustrated, a dispenser 300 may include a base 350, a cap 310, a seal 360, a dispenser head 320, a valve 370, a valve sleeve 392, and a spout 330. In some embodiments of the invention, a dispenser 300 may be assembled, shipped, or otherwise transported to a different location before being assembled or connected to a container 900.

Figure 9:
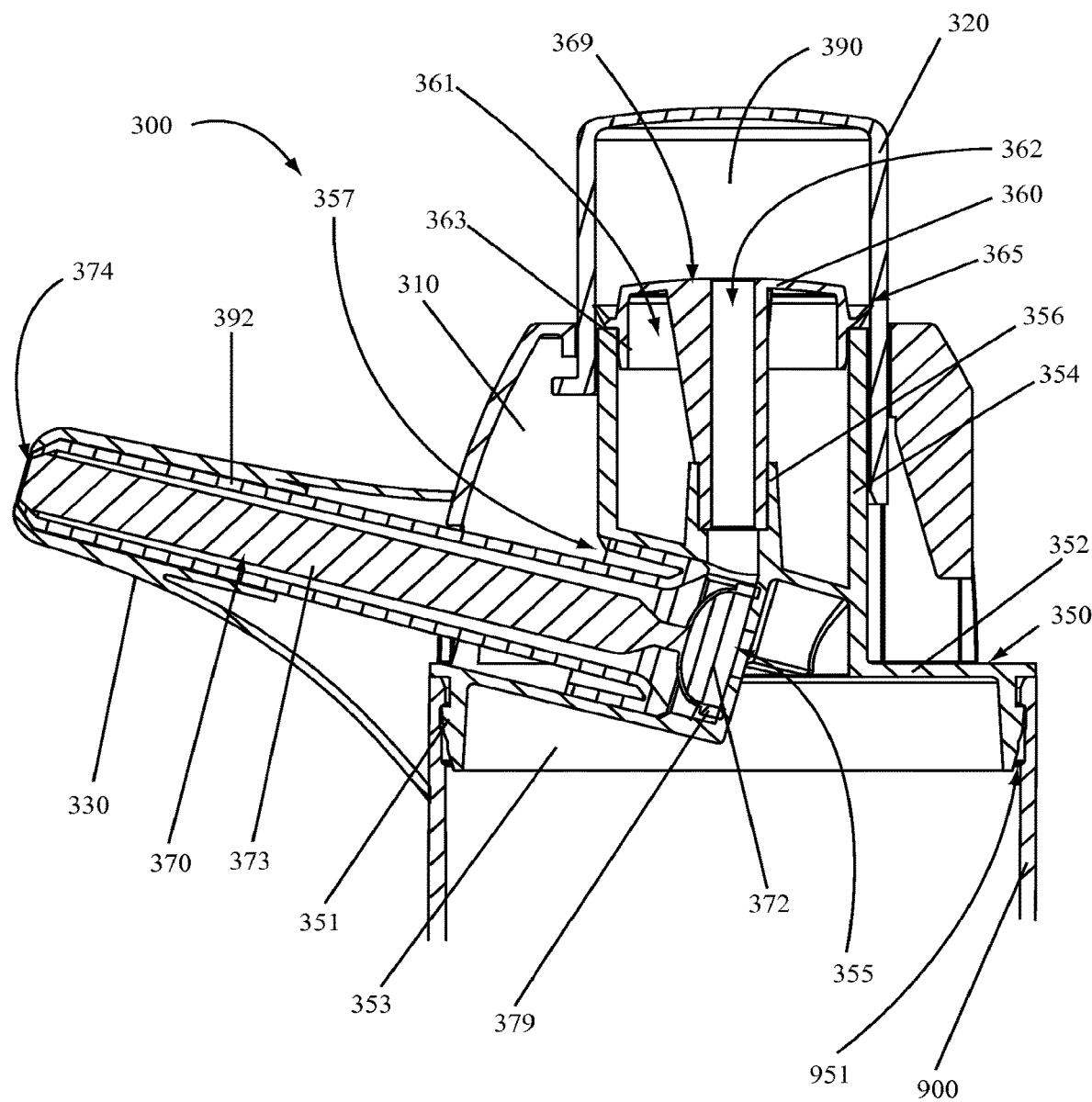
FIG. 9 illustrates a cross-sectional view of a dispenser according to various embodiments of the invention.

A cross-sectional view of a dispenser 300 according to various embodiments of the invention is illustrated in FIG. 9. As illustrated, a base 350 may include a base platform 352 having one or more base skirts 353 projecting off of and away from the base platform 352. One or more base projections 351 may be positioned on an interior or exterior of a base skirt 353. As illustrated in FIG. 9, a base projection 351 may extend away from an outer surface of a base skirt 353 and may be configured to mate with one or more container projections 951 or slots, whereby such interaction between the base projection 351 and container projection 951 may retain the base 350 on a container 900. In other embodiments, a base skirt 353 may interact with a container 900 to retain the base 350 on the container 900.

A base 350 may also include a base support wall 354 extending away from the base wall 352 in a direction opposite the base skirt 353. As illustrated in FIG. 9, a base support wall 354 may include a substantially cylindrical tube or tube portion extending upward from the base wall 352. A top of the base support wall 354 may define an opening into the cylindrical tube or tube portion of the base 350. A base seal seat 356 may be positioned within an interior of the base support wall 354 tube or tube portion as illustrated. A base seal seat 356 may include a tubular member extending towards the opening at the top of the base support wall 354. The base seal seat 356 may include projections, tapered portions, or other features capable of interacting with or connecting to a seal 360 according to various embodiments of the invention.

A base 350 may also include a valve sleeve seat 357 configured to accept and retain a valve sleeve 392. As illustrated in FIG. 9, a valve sleeve seat 357 may include a tubular opening within the base 350 configured to retain a valve sleeve 392. As illustrated, a valve sleeve seat 357 may be angled such that a valve sleeve 392 fitted in the valve sleeve seat 357 may project at a desired angle away from the base 350. While the valve sleeve seat 357 illustrated in FIG. 9 is tubular in shape, it is understood that other shapes or configuration may also be used with various embodiments of the present invention. For example, a valve sleeve 392 may include a square or rectangular portion to be fitted with or connected to a base valve sleeve seat 357.

An inlet 355 in the base 350 may include an opening positioned at an end of the valve sleeve seat 357 as illustrated in FIG. 9. Thus, in some embodiments of the invention, a base 350 may define a valve sleeve seat 357 having an opening at one end to accept assembly of a valve sleeve 392 and an inlet 355 at the opposite end of the valve sleeve seat 357. Product may flow from an interior of a container 900 attached to a dispenser 300 through the inlet 355 and into the dispenser 300. According to some embodiments of the invention, an inlet 355 may also be configured to retain a dip tube such that product from within a container 900 may be drawn through the dip tube and in turn through the inlet 355 into the dispenser 300. In still other embodiments of the invention, the inlet 355 may be adjacent to or part of a connection configured to be sealed to a bag or pouch. Product from within the bag or pouch may flow through the inlet 355 and into the dispenser 300.

According to certain embodiments of the invention, a seal 360 may include a seal body 361 having one or more seal edges 365 projecting therefrom. As illustrated in FIGS. 8 and 9, a seal body 361 may include a top surface 369 having one or more seal skirts 363 projecting away from the top surface. One or more seal edges 365 may project outward or away from an outer surface of the outermost seal skirt 363. A portion of the one or more seal edges 365 may rest on ends of, or portions of, the base support wall 354. A portion of the seal skirts 363 may extend into an interior area bounded by the base support wall 354 and may interact with the base support wall 354. For example, in certain embodiments of the invention, a portion of a seal skirt 363 may fit against an interior portion of the base support wall 354 such that an interference between the seal skirt 363 and the base support wall 354 retains the seal 360 in a position mounted to the base support wall 364.

According to certain embodiments of the invention, a seal 360 may include one or more flow passages through the seal 360. As illustrated in FIG. 9, a seal 360 may include a single flow passage 362 extending through the seal 360. A flow passage 362 may include a tubular structure having a first opening adjacent the top surface 369 and a second opening at the opposite end of the flow passage 362. The tubular structure may depend from the top surface 369 downward into an interior space defined by the base support wall 354. An end portion of the flow passage 362 adjacent the second opening may be fitted into or around a portion of the base seal seat 356. As illustrated in FIG. 9, the flow passage 362 may fit into the base seal seat 356 and may be secured there. In some embodiments, the base seal seat 356 may be configured with one or more features to retain an end of the flow passage 362 in the base seal seat 356 once inserted therein or an outer surface of the flow passage 362 may be configured with one or more features to retain the end of the flow passage 362 in the base seal seat 356.

A flow passage 362 according to various embodiments of the invention may act as both an inlet and outlet passageway for fluid or product passing through the inlet 355 from a container 900. For example, as illustrated in FIG. 9, fluid flowing in the inlet 355 may flow through the flow passage 362, into a dosing chamber 390 and out of a dosing chamber 390 into an interior portion of the valve sleeve 392.

A dispenser 300 according to various embodiments of the invention may also include a dispenser head 320. A dispenser head 320 may include a hollow structure having a single open end that may fit over or around a base support wall 354. A top, closed end of the dispenser opposite the open end may define portion of a dosing chamber 390 defined by the dispenser head 320 and seal 360. As illustrated in FIG. 9, a dispenser head 320 may fit over over and around a base support wall 354. One or more seal edges 365 of a seal 360 fixed to the base support wall 354 may abut against an interior wall or surface of the dispenser head 320 in a fluid-tight manner. A region between the top surface 369 of the seal and the interior surface of the closed end of the dispenser head 320 may define a dosing chamber 390.

According to various embodiments of the invention, movement of the dispenser head 320 may increase or decrease the size of the dosing chamber 390. For example, when a closed end of a dispenser head 320 is moved vertically away from a seal 360, the dosing chamber 390 expands. When a closed end of a dispenser head 320 is moved towards a seal 360, the dosing chamber 390 shrinks or decreases in size. Product may be drawn into the dosing chamber 390 by moving the dispenser head 320 vertically away from the seal 360 and pushed out of the dosing chamber 390 by pushing the closed end of the dispenser head 320 towards the seal 360.

A lever 322 may extend off of a dispenser head 320 as illustrated in FIG. 8. A lever 322 may be used to move a dispenser head 320 up-and-down or in a rotational manner. For example, in some embodiments of the invention, a dispenser head 320 may be rotated about an axis through the center of the dispenser head 320 to select a desired dose to be obtained using the dispenser 300. A lever 322 extending off of the dispenser head 320 may be used to initiate such movement. In addition, a lever 322 may be used to move the dispenser head 320 vertically away from a container 900 or downward, towards a container 900 during use of the dispenser 300.

According to certain embodiments of the invention, a dispenser head 320 may include a sleeve opening 321 in a portion thereof as illustrated in FIG. 8. The sleeve opening 321 may be configured to allow the dispenser head 320 to rotate about a central axis without interference from a valve sleeve 392 being used with the dispenser 300.

Dispenser heads 320 according to various embodiments of the invention may be made of any desired material. However, in some embodiments, it may be beneficial for the dispenser head 320 to be made of a clear, transparent, or semi-transparent material such that a dose of product contained in the dosing chamber 390 defined by the dispenser head 320 may be visible through the dispenser head 320. For example, many users wish to visually confirm the size or look of a dose of medicine. Utilizing a dispensing device 950 having a dispenser head 320 made of a transparent material according to various embodiments of the invention, a user may confirm the presence of a dose of medicine in the dosing chamber 390 before administering the dose of medicine.

A dispenser 300 according to various embodiments of the invention may include a valve sleeve 392 fitted into a base valve sleeve seat 357. A valve sleeve 392 may be configured to retain one or more valves therein to control dispensing of a fluid or product from the dispenser 300. As illustrated in FIG. 9, a valve sleeve 392 may include an opening on a first end thereof and an opening on a second end thereof. The opening on the first end may be adjacent one or more connection portions configured to mate with or fit into a base valve sleeve seat 357. As illustrated, in some embodiments a secondary flange extending off of a first end of the valve sleeve 392 may be configured to snap-fit, interference fit, compression fit, or otherwise connect to the base 350 at the base valve sleeve seat 357. Other connection systems may be developed or used with various embodiments of the invention to secure a valve sleeve 392 with a base 300.

According to various embodiments of the invention, a valve sleeve 392 may include a valve seat at a second end of the valve sleeve 392 adjacent the second opening. In some embodiments of the invention, the valve sleeve 392 may include a tapered interior surface as illustrated in FIG. 9 against which a valve 370 may rest or seat to seal-off and close the second opening in the valve sleeve 392. While such feature is illustrated in FIG. 9, other embodiments of the invention may include a differently configured valve seat. In still other embodiments of the invention, there may be no valve seat and instead a valve may be attached to the end of the valve sleeve 392. For example, a duck-bill type valve may be fitted to the end of a valve sleeve 392 adjacent the second opening to limit flow of product out of the interior portion or chamber of the valve sleeve 392.

The interior chamber formed within the valve sleeve 392 may be configured as desired. During operation of a dispenser 300, product or fluid may reside within a portion of the interior chamber formed within the valve sleeve 392.

One or more valves 370 may be seated within the interior chamber—or a portion thereof—of the valve sleeve 392. In some embodiments of the invention, a valve may be seated at the second end of the valve sleeve 392 to prevent leakage or dispensing of a product from the interior chamber of the valve sleeve 392 until the valve 370 is moved or unseated. For example, a valve 370 according to various embodiments of the invention is illustrated in FIGS. 8 and 9. As illustrated, a valve 370 may include an inlet valve 372 and an outlet valve 374. The inlet valve 372 may be seated about the inlet 355 or in a valve seat adjacent to the inlet 355. The outlet valve 374 may be seated in the second end of the valve sleeve 392 and may prevent fluid or product from leaving the interior of the valve sleeve 392 until the outlet valve 374 is unseated.

According to various embodiments of the invention, a valve 370 may include a singular valve unit having an outlet valve 374 on one end thereof and an inlet valve 372 on the opposite end. As illustrated in FIGS. 8 and 9, the outlet valve 374 may include a head that seats in a valve seat and the inlet valve may include a bellow or disc capable of flexing or moving. According to certain embodiments of the invention, a valve stem 373 may be connected to the outlet valve 374 and inlet valve 372 and in some embodiments the outlet valve 374 is at one end of the valve stem 373 and the inlet valve 372 is located at the other end of the valve stem 373.

An inlet valve 372 may include a bellow or domed portion having an inlet valve rim 379 about an outer edge thereof. In some embodiments, the inlet valve 372 may include a concave dome made of a flexible material. An inlet valve rim 379 may seat against a portion of the base 350 and form a seal therewith. The inlet valve 372 may move or flex in such a manner as to unseat or break contact between the inlet valve rim 379 and the base 350.

According to certain embodiments of the invention, a valve 370 as illustrated in FIGS. 8 and 9 may function through movement of the inlet valve 372 relative to the valve stem 373 and movement of the valve stem 373 and outlet valve 374 relative to the inlet valve 372. In a non-actuated state, the inlet valve 372 may rest against or sit against a portion of the base 350 about the inlet 355. Fluid entering or passing through the inlet 355 applies a force to the surface of the inlet valve 372. Upon sufficient application of force, the inlet valve 372 separates from contact with the base 350, allowing product to pass into an interior portion of the valve sleeve 392, up through the flow passage 362 in the seal 360, and into the dosing chamber 390. When fluid is passing out of the dosing chamber 390 and back into an interior portion of the valve sleeve 392, such fluid applies a force to the back-side of the inlet valve 372, causing it to flex and move the valve stem 373 which in turn unseats the outlet valve 374, allowing product to be dispensed from the dispensing device 950.

A dispenser 300 may also include a spout 330 positioned over the valve sleeve 392 or a portion thereof. According to various embodiments of the invention, a spout 330 may be fixed to the dispenser 300. In other embodiments, a spout 330 may be attached to the dispenser 300 in a removable manner such that spout 330 may be removed from the dispenser 300 for cleaning or other purposes.

As illustrated in FIGS. 8 and 9, a spout 330 may be shaped to fit a user's mouth. The shape and size of the spout 330 may be configured to allow a user to more easily receive a product from a dispenser 300. For example, if a child is to receive a dose of product from the dispenser 300, the spout 330 may be of a smaller size than a spout 330 shaped to fit the mouth of an adult. According to certain embodiments of the invention, a spout 330 may provide a surface configured and shaped to allow dispensing of a product into the mouth of a user or person the user is interacting with. For instance, a spout 330 may be shaped to allow a user or subject to put their lips about the spout 330 so that a product could be delivered from the dispenser 300 to the user or subject.

A cap 310 may be fit on or to the base 350, enclosing portions of the dispenser head 320, seal 360, and base 350. In addition, a cap 310 may include one or more lever paths 312. A lever path 312 according to various embodiments of the invention may include a path through which a lever 322 associated with dispenser head 320 may move during operation of the dispenser 300. In some embodiments, more than one lever path 312 may be included in a cap 310 such that each level path 312 may have a different length, allowing a lever 322 to move along the lever path 312 for the given distance. According to certain embodiments of the invention, the length of the lever path 312 may prevent the dispenser head 320 from further movement, thereby regulating the dose or amount of product drawn into the dosing chamber 390. For example, if two lever paths 312 exist, a first lever path 312 may allow sufficient movement of the dispenser head 320 to load 10 mL of product into the dosing chamber 390 while a second lever path 312 may allow sufficient movement of the dispenser head 320 to load 20 mL of product into the dosing chamber 390. The lever path 312 lengths may be designed to allow for a desired dosing based on the size or volume of the dosing chamber 390 of the dispenser 300.

According to some embodiments of the invention, a dispenser head 320 may also include one or more projections or features extending off of an outer surface thereof and a cap 310 having one or more projections or features extending off of an interior surface thereof. The features on the dispenser head 320 may interact with the features on the cap 310 to limit vertical or up-and-down movement of the dispenser head 320 relative to the cap 310. By limiting the movement of the dispenser head 320, the volume of the dosing chamber 390 may be limited. In some embodiments of the invention, the features on the dispenser head 320 and cap 310 may correspond with movement of the lever 322 or the lever paths 312 and may provide additional stopping positions or reinforced stopping positions such that a user will not be capable of over-dosing or changing the desired dose for a given lever 322 position relative to the lever paths 312.

According to various embodiments of the invention, a dispenser 300 may be assembled from a base 350, a seal 360, a dispenser head 320, a valve 370, a valve sleeve 392, and a spout 330. In some embodiments, a valve 370 and valve sleeve 392 may be fitted to a base 350 with the valve 370 on an interior of the valve sleeve 392. A seal 360 may be seated on the base 350 and a dispenser head 320 assembled over the seal 360 and about a base support wall 354. A cap 310 may be assembled over the dispenser head 320 and snap-fit or otherwise connected to the base 350. A spout 330 may be fit over the valve sleeve 392 and attached to the base 350. In some embodiments, a spout 330 may not be assembled with the dispenser 300 but shipped or provided separately. For example, in some embodiments of the invention, an assembled dispenser 300 may be provided with one or more detachable spouts 330 that can be assembled to and removed from the dispenser 300 for washing, sanitizing, or changing for a particular user. The dispenser 300 may be assembled to a container 900 or a container 900 containing a product.

A dispensing system 950 according to various embodiments of the invention is illustrated in FIGS. 10 through 16. While particular configurations and aesthetics of a dispensing system 950 are shown, it is understood that alternate aesthetics and configurations could be designed utilizing a dispenser 300 according to various embodiments of the invention.

Figure 10:
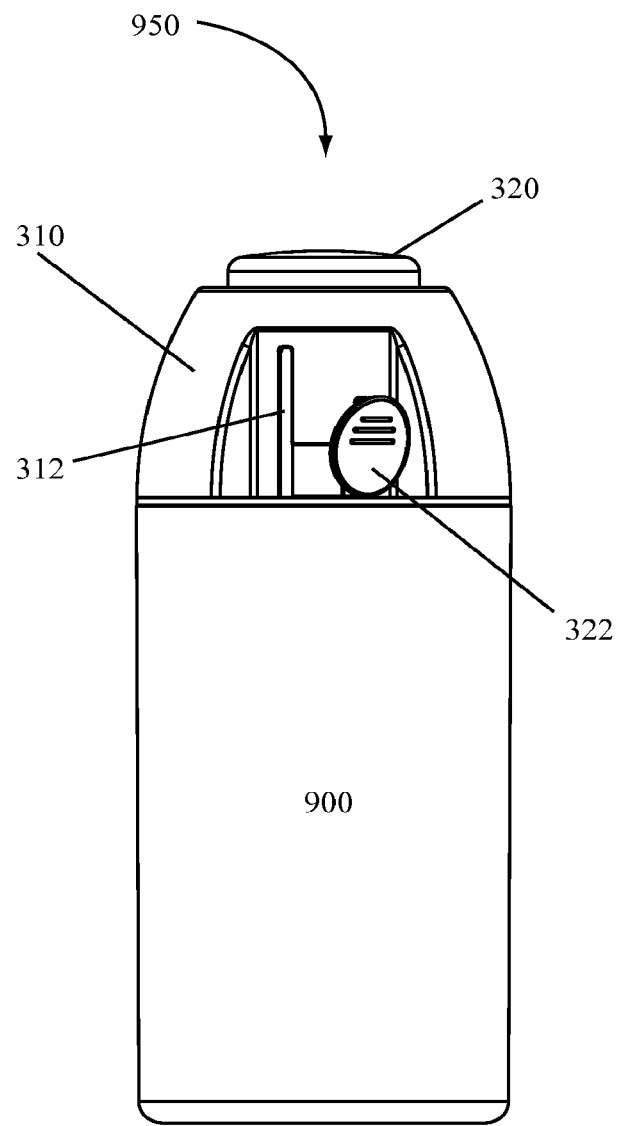
FIG. 10 illustrates a rear-view of a dispensing device according to various embodiments of the invention.

A rear-view of a dispensing system 950 in a non-dispensing mode or position is illustrated in FIG. 10. As illustrated, a dispensing system 950 according to certain embodiments of the invention includes a dispenser 300 attached to a container 900. The dispenser 300 includes a dispenser head 320 in a down, or non-actuated position. A lever 322 attached to the dispenser head 320 is adjacent the container 900 and is aligned with the first of two lever paths 312, the first lever path 312 being shorter than the second lever path 312.

Figure 11:
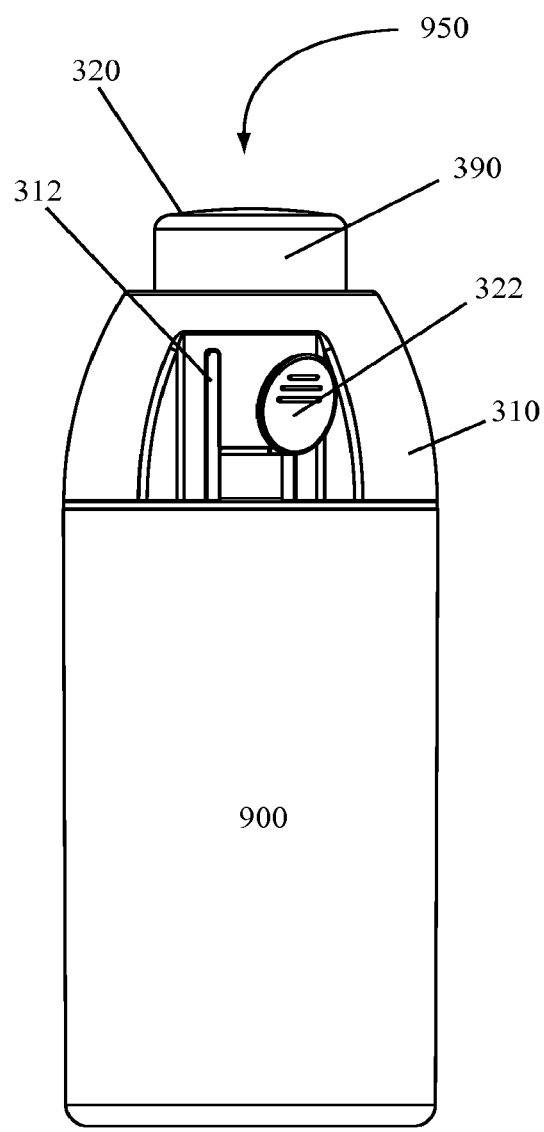
FIG. 11 illustrates a rear-view of a dispensing device according to various embodiments of the invention.

FIG. 11 illustrates a rear-view of the dispensing system 950 illustrated in FIG. 10 in a primed state, or in a state in which product has been drawn into a dosing chamber 390 defined in an interior portion of the dispenser head 320. As illustrated, the lever 322 attached to the dispenser head 320 has been raised or moved along the first lever path 312 to the end thereof. Further movement of the dispenser head 320 in a vertical position is prevented by interaction of the lever 322 with the top, stop portion of the lever path 312.

Figures 12, 13:
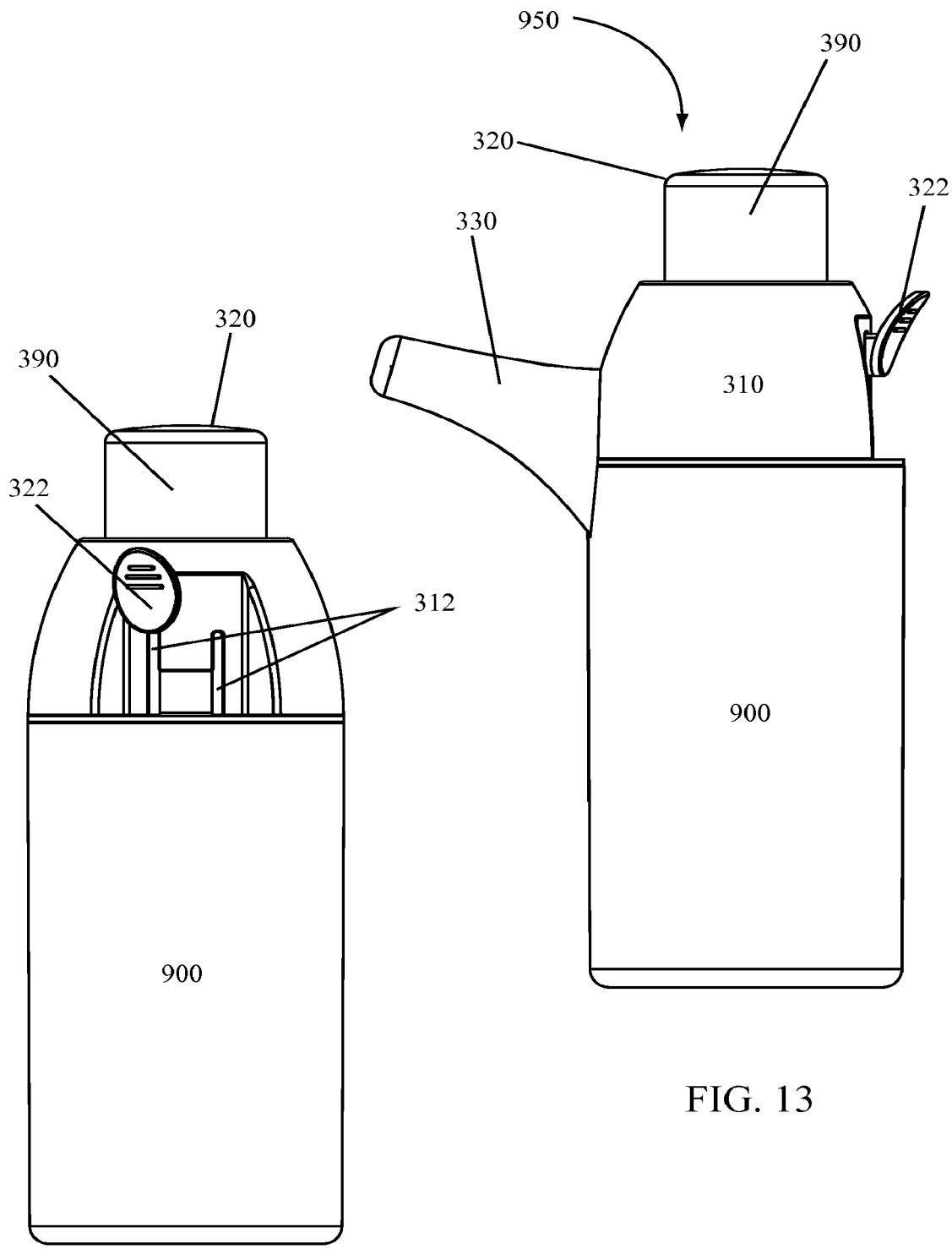
FIG. 12 illustrates a rear-view of a dispensing device according to various embodiments of the invention.
FIG. 13 illustrates a side-view of a dispensing device according to various embodiments of the invention.

Similarly, FIG. 12 illustrates a rear-view of the dispensing system 950 illustrated in FIG. 10 in a primed state, or in a state in which product has been drawn into the dosing chamber 390. Unlike the dispensing system 950 illustrated in FIG. 11, the dispenser 300 illustrated in FIG. 12 includes the lever 322 positioned in a top portion of the second lever path 312, resulting in a larger dosing chamber 390. As illustrated, the lever 322 illustrated in FIG. 10 may be moved or rotated from a position adjacent the first lever path 312 to a position adjacent the second lever path 312 and then moved vertically along the second lever path 312 to a stop position at the top portion of the second lever path 312.

As illustrated in FIGS. 10 through 12, a dispensing system 950 according to various embodiments of the invention may be used to load different doses of a product into a dosing chamber 390 of a dispenser 300 based on the selection of a lever path 312 and movement of a lever 322 along the lever path 312. As illustrated, a shorter lever path 312 restricts a dose loaded into the dosing chamber 390 to a smaller dose than that allowed by the longer lever path 312. In this manner, a user may select a desired dose and load the dosing chamber 390 with the selected dosage amount.

The dispensing system 950 illustrated in FIG. 12 is also illustrated in FIGS. 13 through 16. As illustrated in FIG. 13, when a dispenser 300 is loaded with a dose of product, the dispenser head 320 extends above the top edge of the cap 310 and the lever 322 is at the top end of a lever path 312. To dispense the dose of product in the dosing chamber 390, a user may press down on the top of the dispenser head 320 or on the lever 322. As the dispenser head 320 is moved downward, product from within the dosing chamber 390 is dispensed from the dispenser 300.

Figure 14:
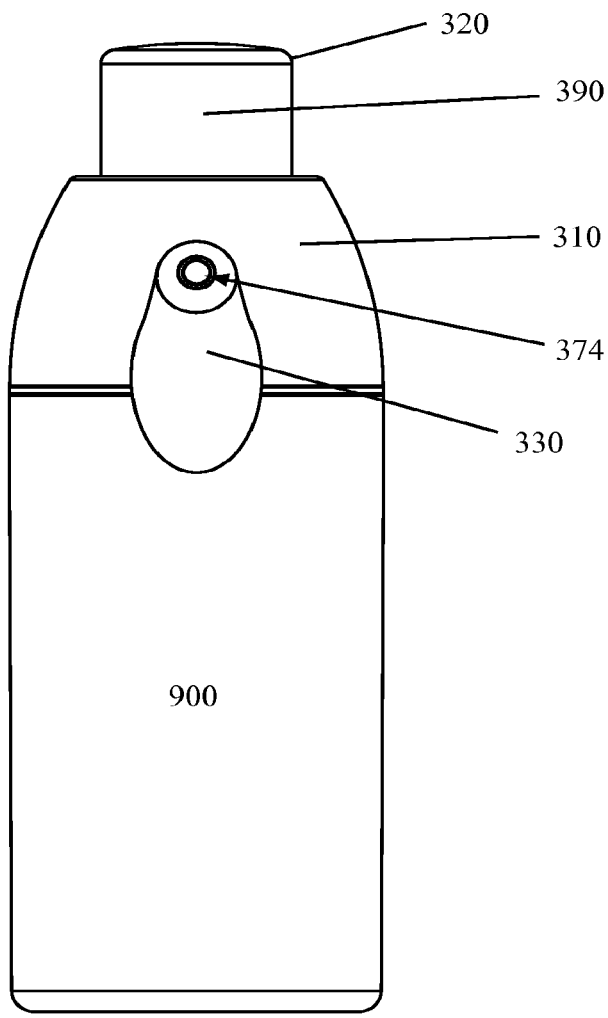
FIG. 14 illustrates a front-view of a dispensing device according to various embodiments of the invention.
Figure 15:
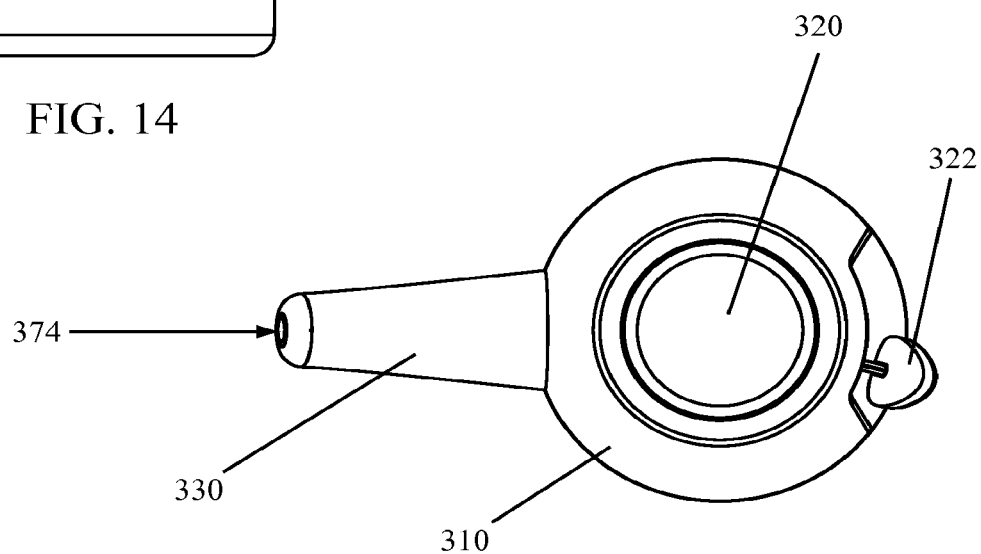
FIG. 15 illustrates a top-view of a dispensing device according to various embodiments of the invention.
Figure 16:
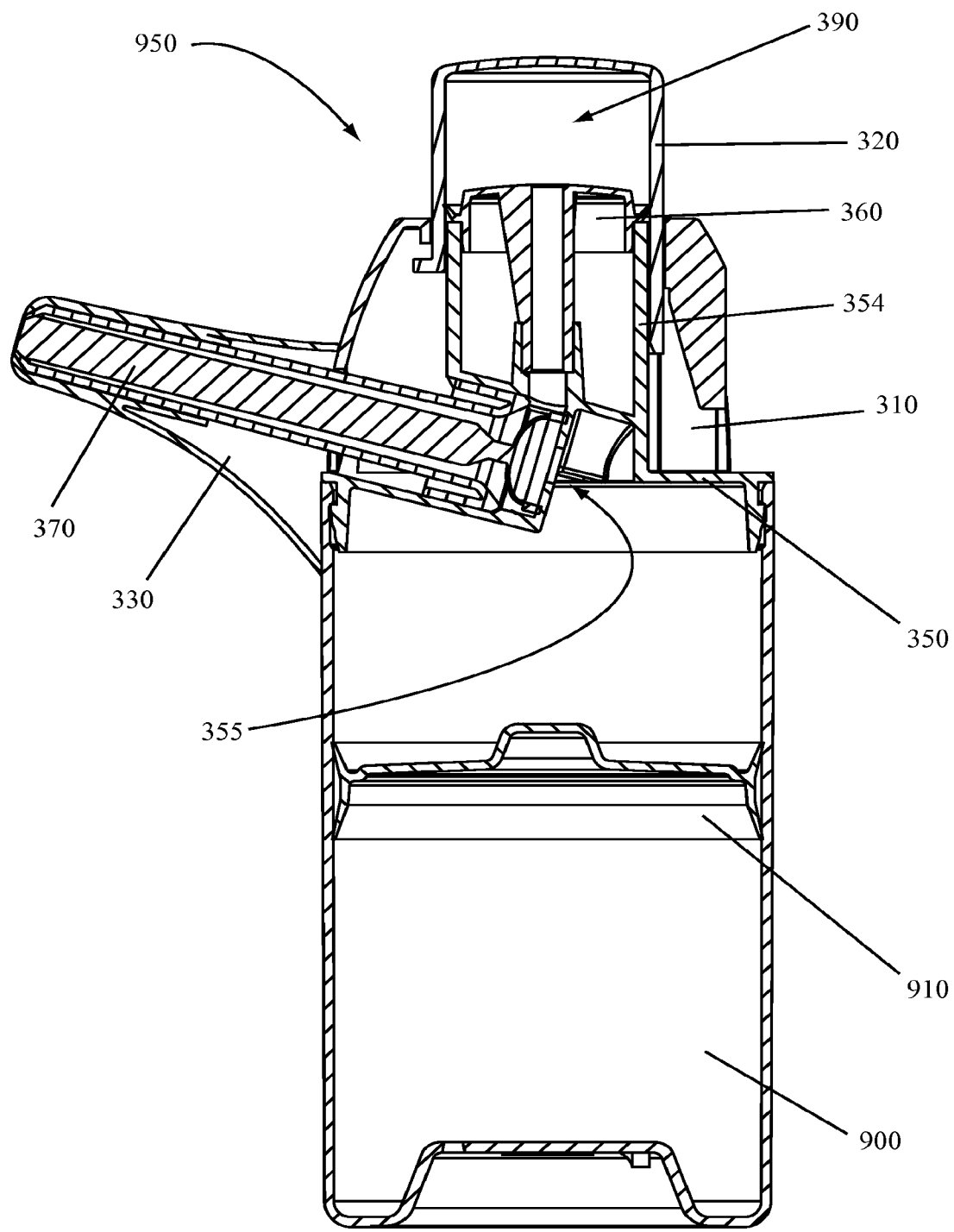
FIG. 16 illustrates a cross-sectional view of a dispensing device according to various embodiments of the invention.

A front view of the dispensing system 950 is illustrated in FIG. 14 and a top view is illustrated in FIG. 15. A cross-sectional view of the dispensing device 950 in the charged or loaded position is illustrated in FIG. 16.

Figure 17:
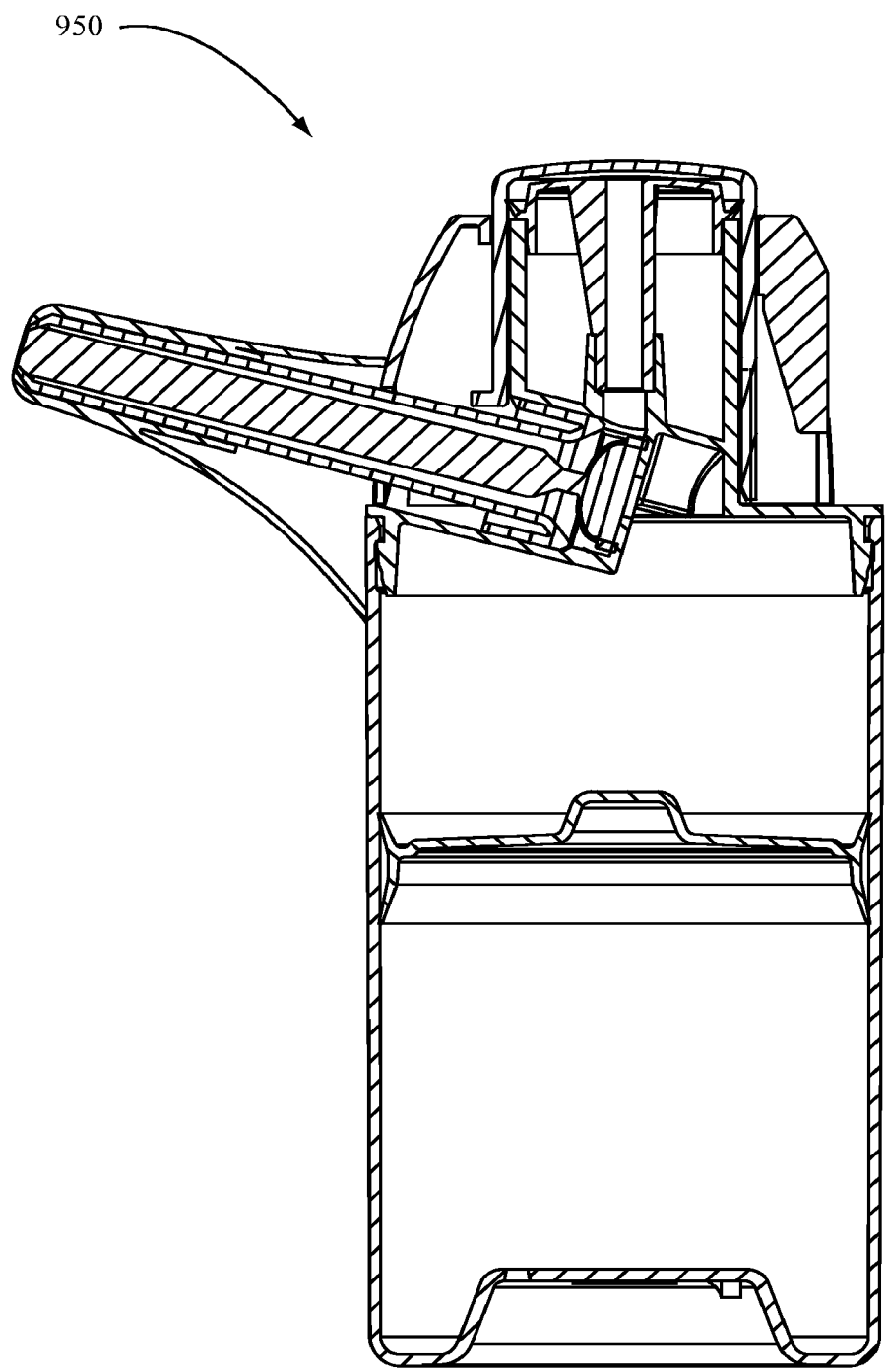
FIG. 17 illustrates a cross-sectional view of a dispensing device in a non-actuated state according to various embodiments of the invention.

Operation of a dispensing system 950 according to various embodiments of the invention is illustrated in FIGS. 17 through 20. A dispensing system 950 in an unloaded state is illustrated in FIG. 17. The dispenser head 320 is in an initial position such that the interior surface of a top portion of the dispenser head 320 is adjacent the seal 360. The dosing chamber 390 has little to no volume and the valve 370 is seated with the outlet valve 374 sealed against the orifice end of the valve sleeve 392 and the inlet valve 372 seated against the base 350. In this configuration, the dispensing device 950 is ready to be loaded with a dose of product from container 900.

Figure 18:
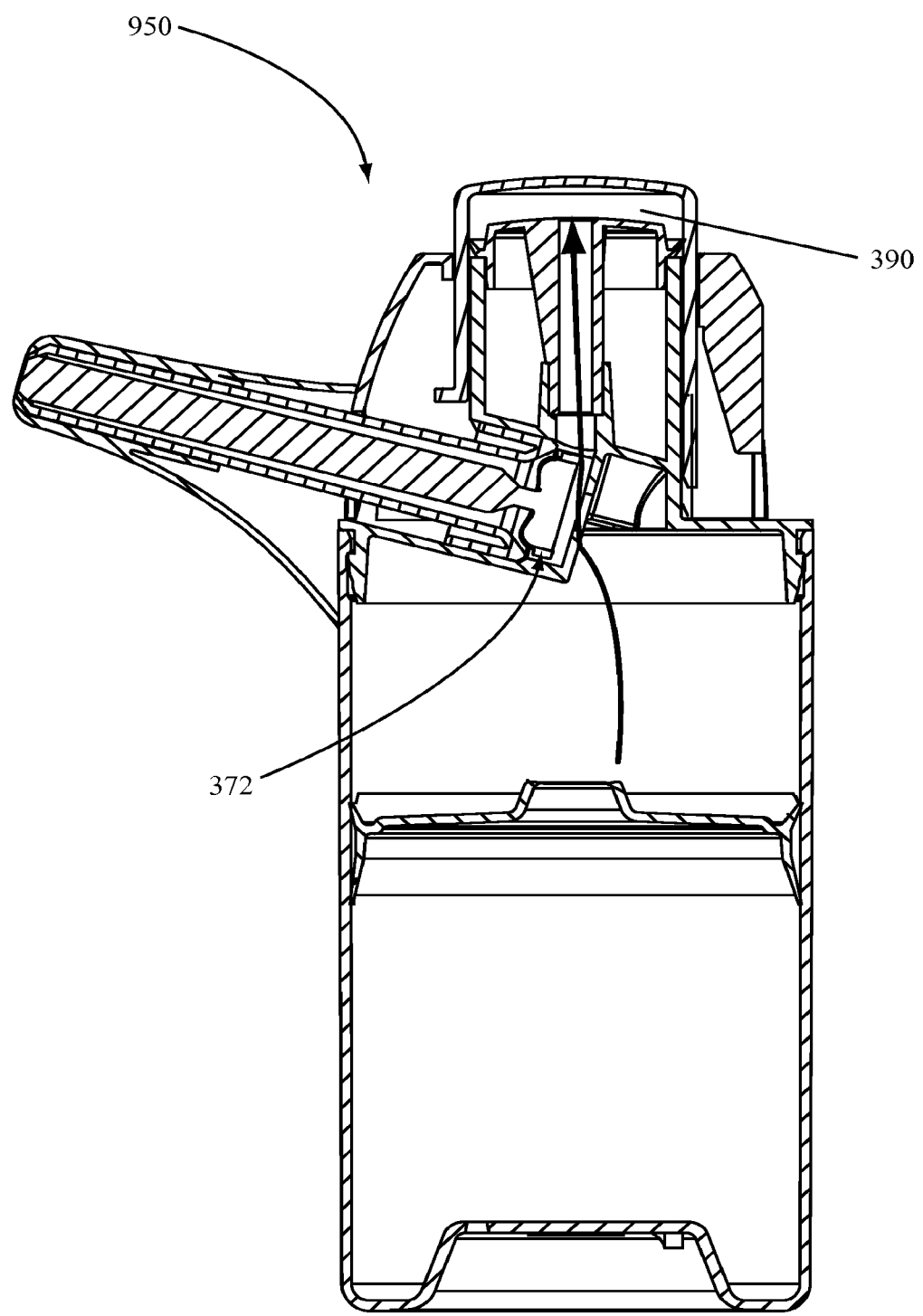
FIG. 18 illustrates a cross-sectional view of a dispensing device during loading of a dosing chamber according to various embodiments of the invention.

To load the dosing chamber 390 with a dose of product from container 900, a user may move the dispenser head 320 vertically, away from the seal 360 or the container 900 as illustrated in FIG. 18. For example, a user may push on a lever 322 which may ride or be guided by a lever path 312. As an upward force is applied to the lever 322, the dispenser head 320 moves upwards or vertically, increasing the volume within the dosing chamber 390. As the volume in the dosing chamber 390 is increased, force is applied to the inlet valve 372, lifting at least a portion of the edges of the inlet valve 372 off of base 350 and product is drawn through inlet 355, past the inlet valve 372, and into the dosing chamber 390 as represented by the arrow illustrating the product flow path in FIG. 18. As product is moved into the dosing chamber 390, piston 910 moves upward into the displaced product space.

Figure 19:
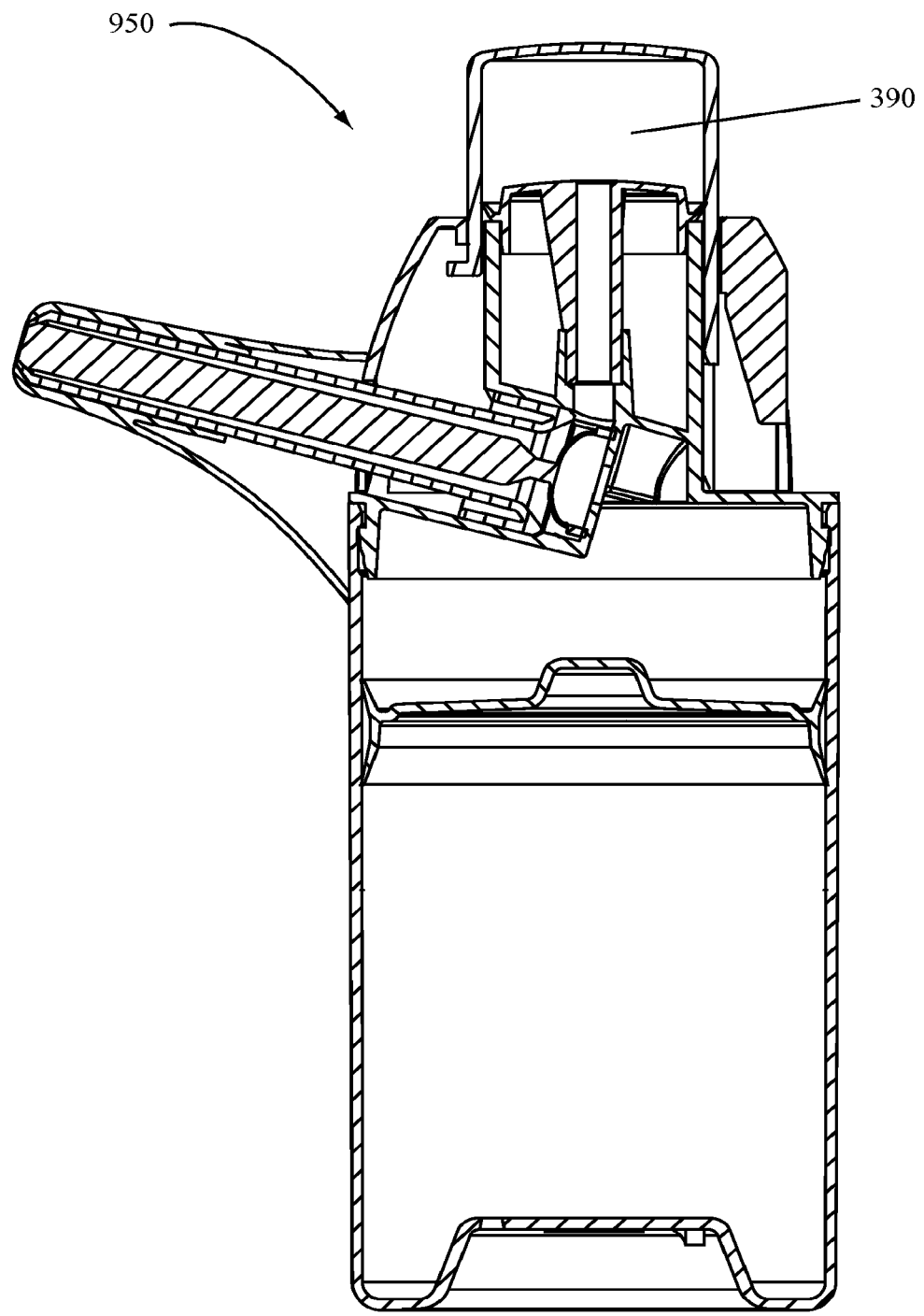
FIG. 19 illustrates a cross-sectional view of a loaded dispensing device according to various embodiments of the invention.

A fully loaded dosing chamber 390 is illustrated in FIG. 19. Once loaded, the inlet valve 372 seats back against the base 350 and the dispenser head 320 is in a vertical position ready for dispersing the product from the dosing chamber 390. In some embodiments, where the dispenser head 320 is made of a clear, transparent, or otherwise see-through material, a user may confirm that there is a dose of product in the dosing chamber 390 in such position.

Figure 20:
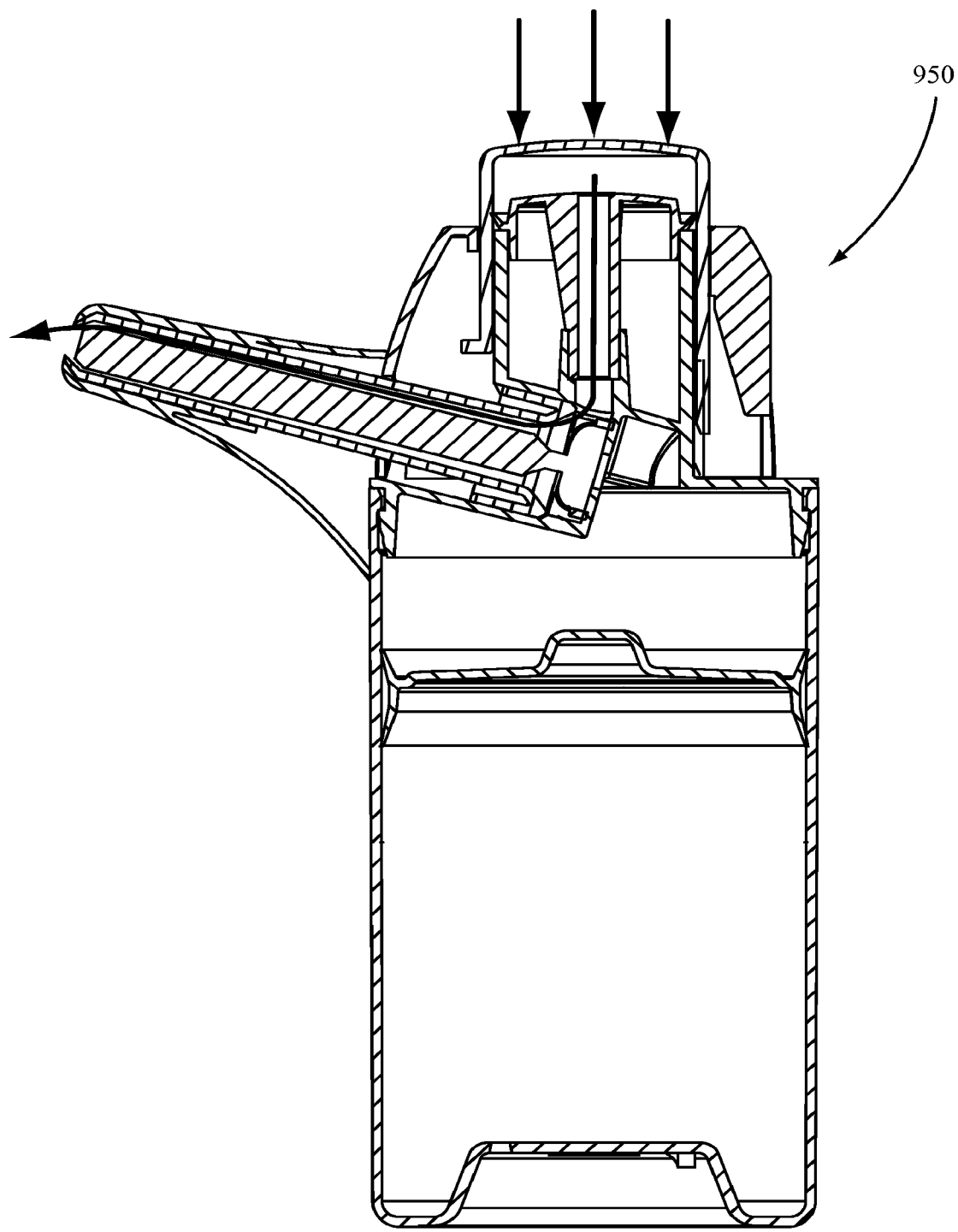
FIG. 20 illustrates a cross-sectional view of a dispensing device during delivery of a dose of product from the dispensing device according to various embodiments of the invention.

In order to dispense a dose of product from the dosing chamber 390 illustrated in FIG. 19, a user may apply a force to the dispenser head 320. A force may be applied to the dispenser head 320 by applying a force to a lever 322 connected thereto or by applying a force to a top surface of the dispenser head 320 as illustrated by the three force arrows in FIG. 20. As the force is applied, the volume of the dosing chamber 290 is reduced, pushing product from the dosing chamber 390 back through the flow passage 362 and into an interior space of the valve sleeve 392. Pressure build-up within the valve sleeve 392 pushes on the interior surface—or back-side surface—of the inlet valve 372, causing the inlet valve 372 to deform towards the inlet 355. This deformation moves the valve stem 373 and in turn unseats the outlet valve 374 from the end of the valve sleeve 392, creating an opening through which product may escape or be dispensed. As illustrated in FIG. 20, product may flow through the interior chamber of the valve sleeve 392 and out the end thereof along the fluid flow path illustrated by the fluid flow arrow.

Upon dispensing the dose contained in the dosing chamber 390, the valve 370 resets with the inlet valve 372 seated against the base 350 and the outlet valve 374 seated against the valve sleeve 392 and the dispenser head 320 is in a down or unloaded position as illustrated in FIG. 17.

It is understood that in some embodiments of the invention it may be difficult to dispense all of the product contained in a dosing chamber through the dispenser to a targeted point such as a surface or a user because of the dead-space or space contained in the spout or interior portion of a valve sleeve of a dispenser. While it may be true that the dose contained in the dosing chamber may not be fully dispensed during actuation of the dispenser, an equivalent amount of product contained in the dispenser is dispensed. Thus, the amount shown in the dosing chamber is equivalent to—or is substantially equivalent to—the amount of product that will be dispensed by the dispenser. For example, as illustrated in FIGS. 17 through 20, an interior of the valve sleeve 392 of the dispenser 300 includes a volume through which the product exiting the dosing chamber 390 must pass before being dispensed. A single actuation is not sufficient to dispense the product in the dosing chamber 390 because at the end of the actuation, at least a portion of the product that has exited the dosing chamber 390 remains resident in the interior of the valve sleeve 392. However, once primed, the dispensing system 950 includes product in the valve sleeve 392 such that when the dosing chamber 390 is emptied, the product leaving the dosing chamber 390 pushes product already in the interior portion of the valve sleeve 392 out of the dispenser 300. In this manner, after the dispenser 300 is primed, the dispenser 300 will dispense an amount of product that is substantially similar to the amount of product contained in the dosing chamber 390.

Dispensing systems 950 according to other embodiments of the invention are illustrated in FIGS. 21 and 22. As illustrated in FIG. 21, a dispenser 300 may be connected to a container 900 and a pouch 510 or bag. The pouch 510 may be connected to the base 350 of the dispenser 300 using any known connection system. For example, the base 350 may include a canoe portion to which a pouch 510 may be sealed such that product passes from the pouch 510, through the canoe, and into an inlet 355. In other embodiments of the invention, a base 350 may be configured to accept a dip tube 520 as illustrated in FIG. 22. Use of a dip tube 520 may be desirable for non-airless systems.

While various embodiments of the invention are described herein, it is understood that the particular embodiments defined by the appended claims are not to be limited by particular details set forth in the description, as many apparent variations thereof are contemplated. Rather, embodiments of the invention are limited only by the appended claims, which include within their scope all equivalent devices or methods which operate according to the principles of the embodiments of the invention described.

What is claimed is:

1. A dispensing device, comprising:
   a container, comprising an opening and an internal volume;
   a piston within the internal volume of the container;
   a dispenser fixed to the opening, the dispenser comprising:
   a base, comprising an inlet path and an outlet path;
   a valve seat received in the base, the valve seat comprising a top disc portion having a peripheral edge seal, an inlet tube, extending downward from the top disc portion, and in fluid communication with the inlet path, and an outlet tube, extending downward from the top disc portion, and in fluid communication with the outlet path;
   a bi-valve seated in the valve seat, the bi-valve comprising an inlet valve seated in an inlet valve seat portion in the inlet tube and an outlet valve seated in an outlet valve seat portion in the outlet tube, wherein the inlet valve seat portion and the outlet valve seat portion are both radially inward of the peripheral edge seal of the valve seat;

a dispenser head seated on the base and in contact with the peripheral edge seal of the valve seat, wherein the peripheral edge seal and an interior portion of the dispenser head define a dosing chamber;

a lock cylinder seated on the base; and a shroud seated over the lock cylinder on the base;

wherein the dispenser head is movable between at least a first position having a dosing chamber with a first volume to a second position having a dosing chamber with a second volume, the second volume being greater than the first volume.

2. The dispensing device of claim 1 further comprising an orifice at an end of the outlet path.

3. The dispensing device of claim 2 further comprising a spout valve within the orifice.

4. The dispensing device of claim 1 further comprising a removable spout received about the outlet path.

5. The dispensing device of claim 3 further comprising a removable spout received about the outlet path, orifice and spout valve.

6. The dispensing device of claim 1 wherein said valve seat further includes a valve retention portion.

7. The dispensing device of claim 1 further comprising a lever integrated with the dispenser head.

8. The dispensing device of claim 5 further comprising a lever integrated with the dispenser head.

9. The dispensing device of claim 1 wherein said lock cylinder includes a plurality of stop limits restricting movement of the dispenser head and defining at least said first position and said second position.

10. The dispensing device of claim 3 wherein said lock cylinder includes a plurality of stop limits restricting movement of the dispenser head and defining at least said first position and said second position.

11. The dispensing device of claim 5 wherein said lock cylinder includes a plurality of stop limits restricting movement of the dispenser head and defining at least said first position and said second position.

12. The dispensing device of claim 7 wherein said lock cylinder includes a plurality of stop limits restricting movement of the dispenser head and defining at least said first position and said second position.

13. The dispensing device of claim 8 wherein said lock cylinder includes a plurality of stop limits restricting movement of the dispenser head and defining at least said first position and said second position.

14. The dispensing device of claim 7, wherein said lever projects radially outward through a gap in said shroud and wherein the lever is operable for moving the dispenser head in an axial direction away from and toward said container to define at least said first position and said second position.

15. The dispensing device of claim 8, wherein said lever projects radially outward through a gap in said shroud and wherein the lever is operable for moving the dispenser head in an axial direction away from and toward said container to define at least said first position and said second position.

* * * * *